US012264017B1

(12) United States Patent
Spranger et al.

(10) Patent No.: US 12,264,017 B1
(45) Date of Patent: Apr. 1, 2025

(54) SYSTEM AND METHOD FOR BULK MATERIAL DUMPING

(71) Applicant: Endura-Veyor, Inc., Alpena, MI (US)

(72) Inventors: Tucker J. Spranger, Alpena, MI (US); Gary W. St. Charles, Jr., Alpena, MI (US); Charles E. Kennedy, II, Alpena, MI (US)

(73) Assignee: Endura-Veyor, Inc., Alpena, MI (US)

( * ) Notice: Subject to any disclaimer, the term of this patent is extended or adjusted under 35 U.S.C. 154(b) by 0 days.

(21) Appl. No.: 18/368,074

(22) Filed: Sep. 14, 2023

(51) Int. Cl.
*B65G 47/34* (2006.01)
*B65G 23/22* (2006.01)

(52) U.S. Cl.
CPC ............ *B65G 47/34* (2013.01); *B65G 23/22* (2013.01); *B65G 2201/04* (2013.01)

(58) Field of Classification Search
CPC .... B65G 47/34; B65G 23/22; B65G 2201/04; B65G 65/23; B65G 2812/0663; B65G 17/126; B65G 21/22; B65F 1/1452; B65F 3/08; B65F 2003/023; B65F 3/043; B65F 1/1468; B66F 7/22; B66B 17/26; B66B 9/06; B66B 9/00; B66B 9/187
USPC ..... 414/381, 382, 332, 405, 416.05, 416.06, 414/420, 423, 424; 100/250; 198/307.1; 104/307, 130.04, 130.09, 130.05
See application file for complete search history.

(56) References Cited

U.S. PATENT DOCUMENTS

| 907,855 | A | * | 12/1908 | Muyser | B65G 67/36 |
| | | | | | 414/598 |
| 1,026,988 | A | * | 5/1912 | Lawton | B65G 67/36 |
| | | | | | 414/598 |
| 1,176,247 | A | * | 3/1916 | Rosendahl | B66B 17/26 |
| | | | | | 414/649 |
| 1,204,216 | A | * | 11/1916 | Walker | B66B 1/48 |
| | | | | | 414/602 |
| 1,458,241 | A | * | 6/1923 | Otterson | B65F 3/08 |
| | | | | | 414/473 |

(Continued)

FOREIGN PATENT DOCUMENTS

| CN | 110171677 A | * | 8/2019 | ............... B66F 7/18 |
| CN | 111003654 A | * | 4/2020 | ............... B65G 5/23 |

(Continued)

*Primary Examiner* — Gregory W Adams
(74) *Attorney, Agent, or Firm* — WARNER NORCROSS + JUDD LLP

(57) ABSTRACT

A bulk material handling system and method intended to transport, lift and/or discharge a quantity of bulk material contained by the payload carrying element. The system may include a drive system located entirely below the displacement of the payload carrying element to reduce required overall height requirements, while also offering virtually unlimited discharge height capability by using tension-only member(s) to transmit drive power to the payload carrying element. The system may also include a guide system with a single main path, intersected by one or more alternative of paths, which may be used in conjunction with a diverter system to provide a method of directing the payload carrying element onto any of the paths and/or to pivot the payload carrying element. The guide system and pivoting mechanism may simultaneously provide greater discharge reach distance than some alternative methods using the same drum size by introducing a horizontally active pivot point.

21 Claims, 16 Drawing Sheets

(56) References Cited

U.S. PATENT DOCUMENTS

| | | | | |
|---|---|---|---|---|
| 1,487,196 A * | 3/1924 | Bledsoe | ............... | B66B 17/26 414/649 |
| 1,492,675 A * | 5/1924 | Clark | ............... | B65F 3/08 414/407 |
| 1,570,302 A * | 1/1926 | Hale | ............... | B66B 17/14 414/649 |
| 1,870,962 A * | 8/1932 | Oldroyd | ............... | B66B 17/26 414/649 |
| 2,508,877 A * | 5/1950 | Walker | ............... | B65F 3/201 414/525.6 |
| 2,592,324 A * | 4/1952 | Oliver | ............... | B65F 3/08 414/409 |
| 2,693,891 A * | 11/1954 | English | ............... | B66B 17/26 414/648 |
| 3,261,300 A * | 7/1966 | Johnson | ............... | E01B 25/22 104/130.09 |
| 3,378,153 A * | 4/1968 | Domenighetti | ............... | B66B 17/26 414/598 |
| 3,415,499 A * | 12/1968 | Ebert | ............... | B66B 17/26 366/45 |
| 3,526,192 A * | 9/1970 | Parshall | ............... | B61B 10/04 104/130.09 |
| 3,760,739 A * | 9/1973 | Benner | ............... | B61L 23/005 310/12.32 |
| 4,498,399 A * | 2/1985 | Wakabayashi | ............... | E01B 25/26 104/103 |
| 4,599,034 A * | 7/1986 | Kennedy | ............... | B66F 7/22 254/89 R |
| 6,354,224 B1 * | 3/2002 | Devnani | ............... | B61L 23/005 104/130.06 |
| 9,114,811 B2 * | 8/2015 | Conte | ............... | B61B 12/00 |
| 2021/0253347 A1 * | 8/2021 | Pung | ............... | B65F 3/10 |

FOREIGN PATENT DOCUMENTS

| | | | | |
|---|---|---|---|---|
| DE | 1067575 B | * | 10/1959 | ............ B66B 17/26 |
| DE | 19905933 A1 | * | 8/2000 | ............... B65F 3/08 |
| GB | 532803 A | * | 1/1941 | ............... B60P 1/48 |
| GB | 2445119 A | * | 6/2008 | ............ B66B 9/187 |

* cited by examiner

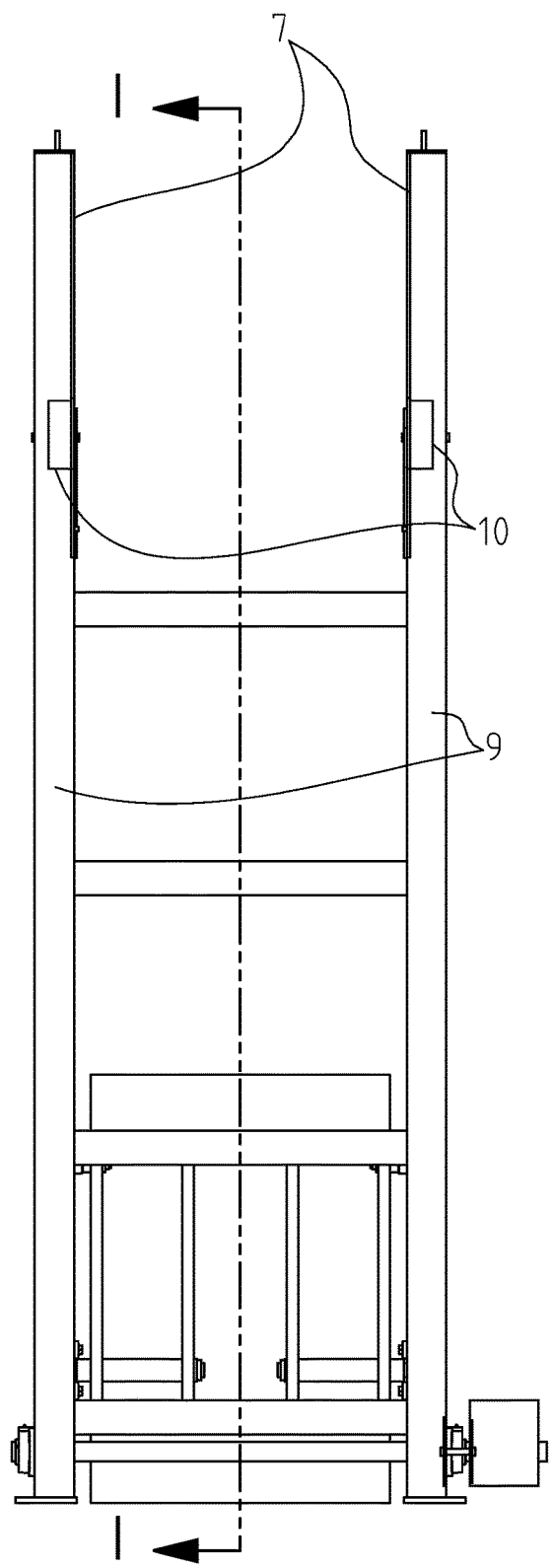
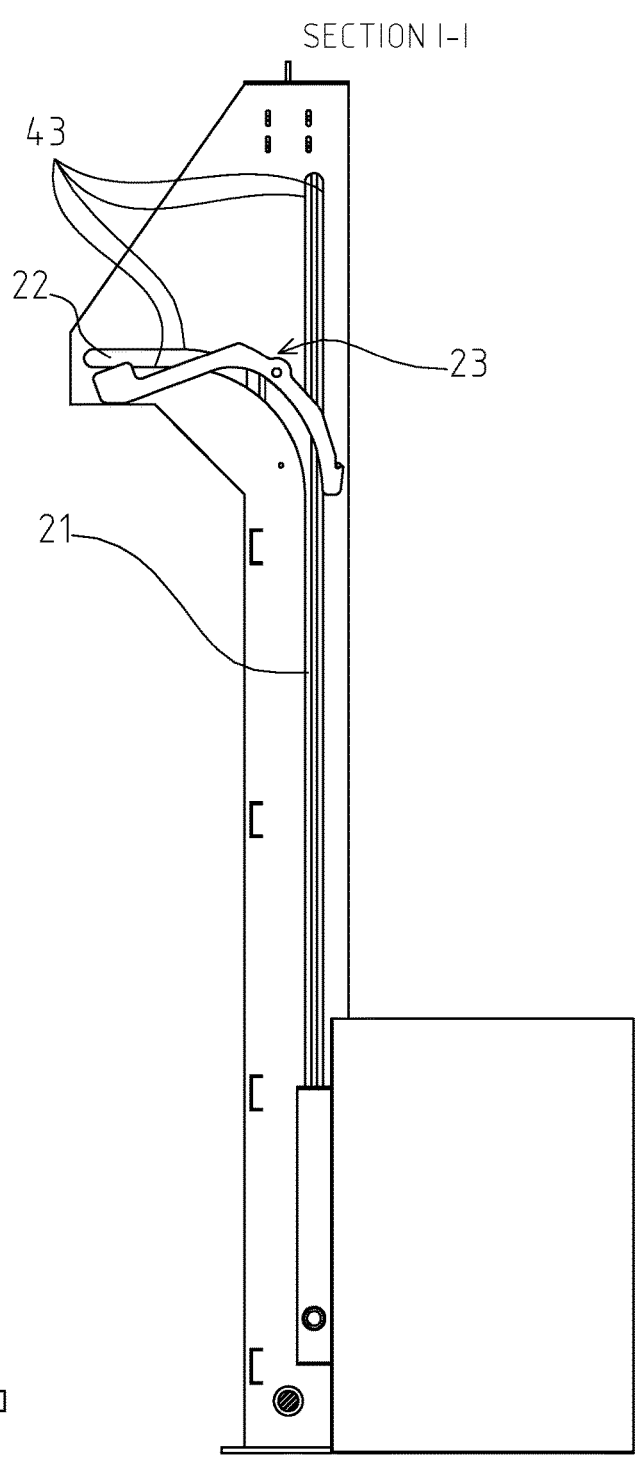
FIG 5A
FIG. 5B

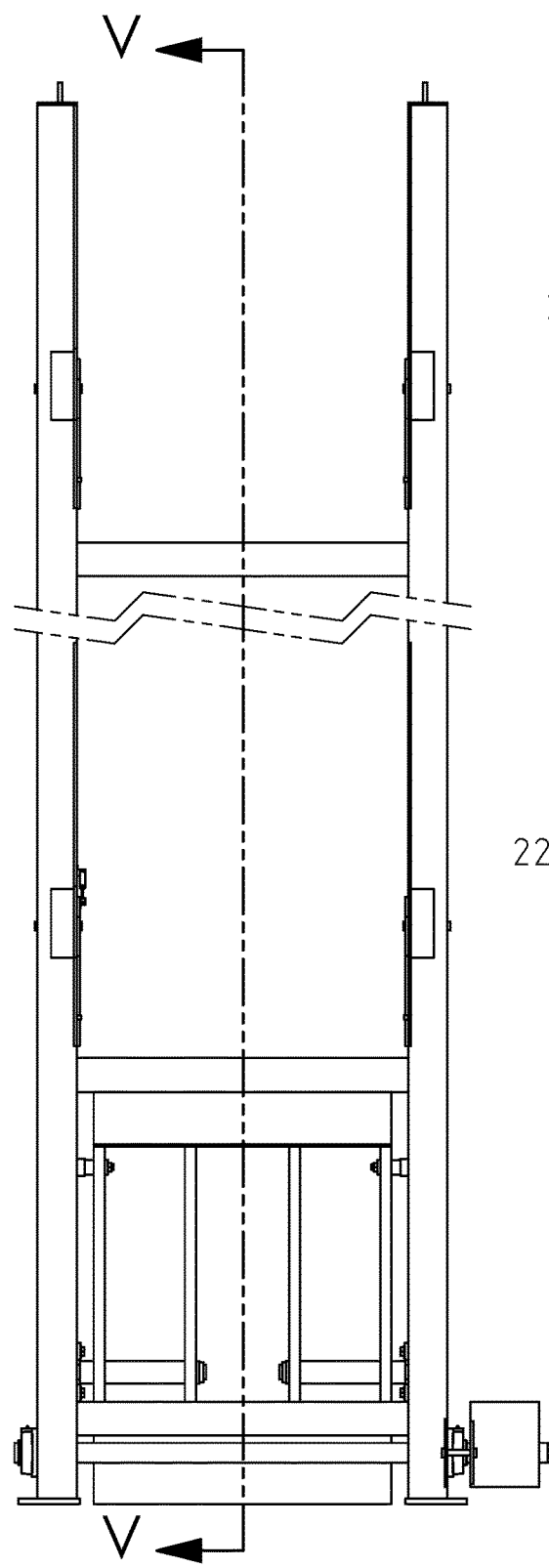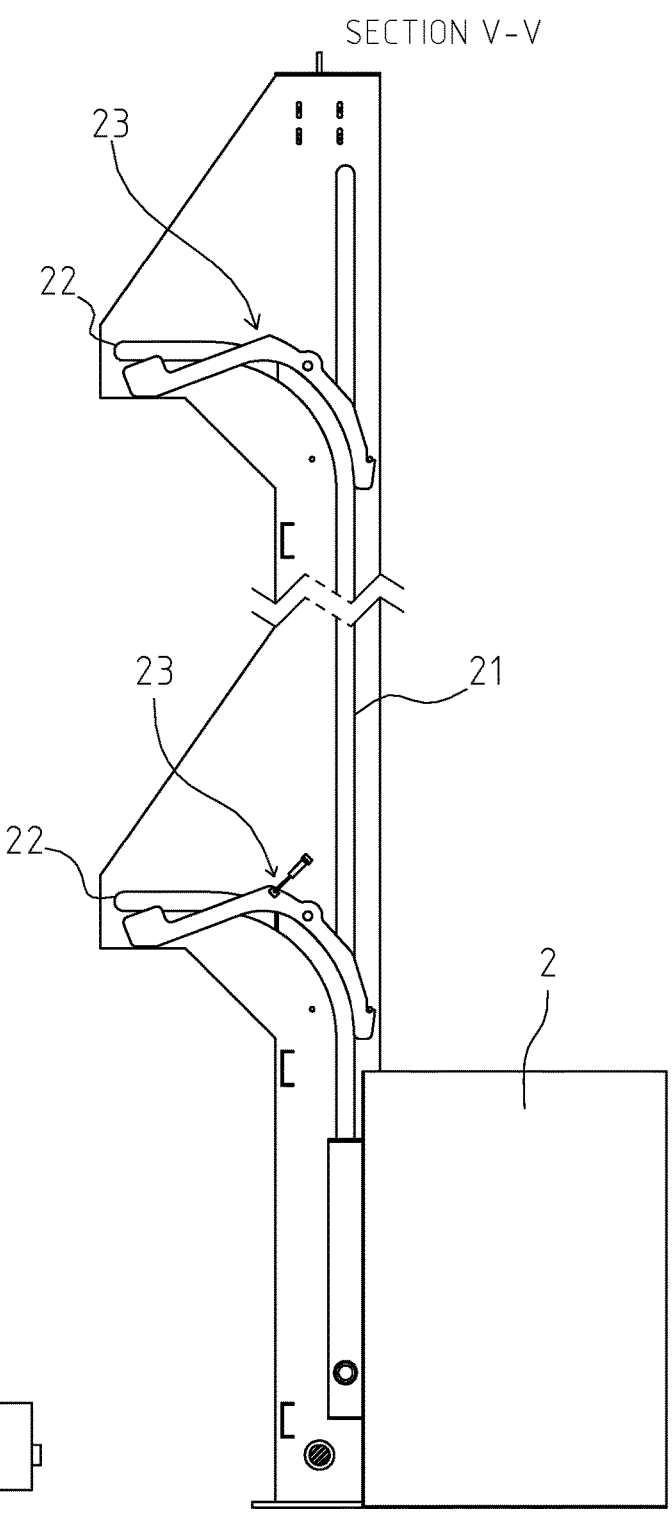
FIG. 11A
FIG. 11B

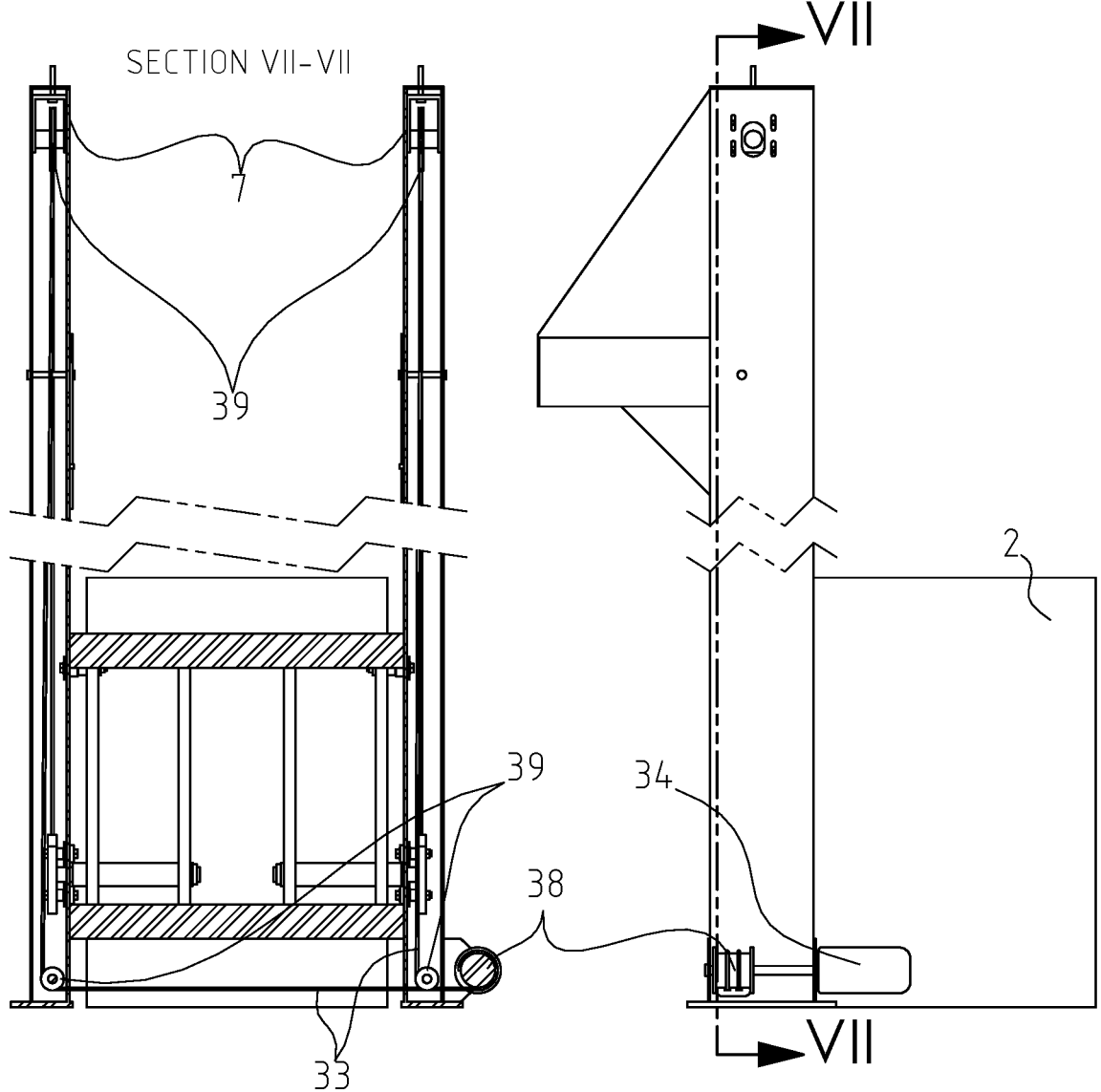

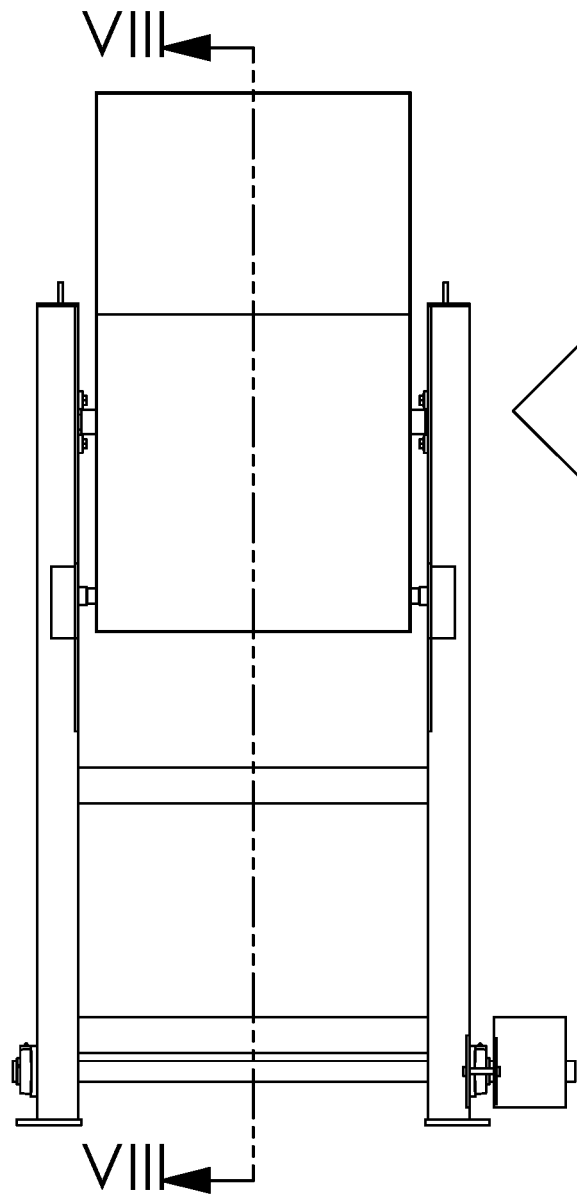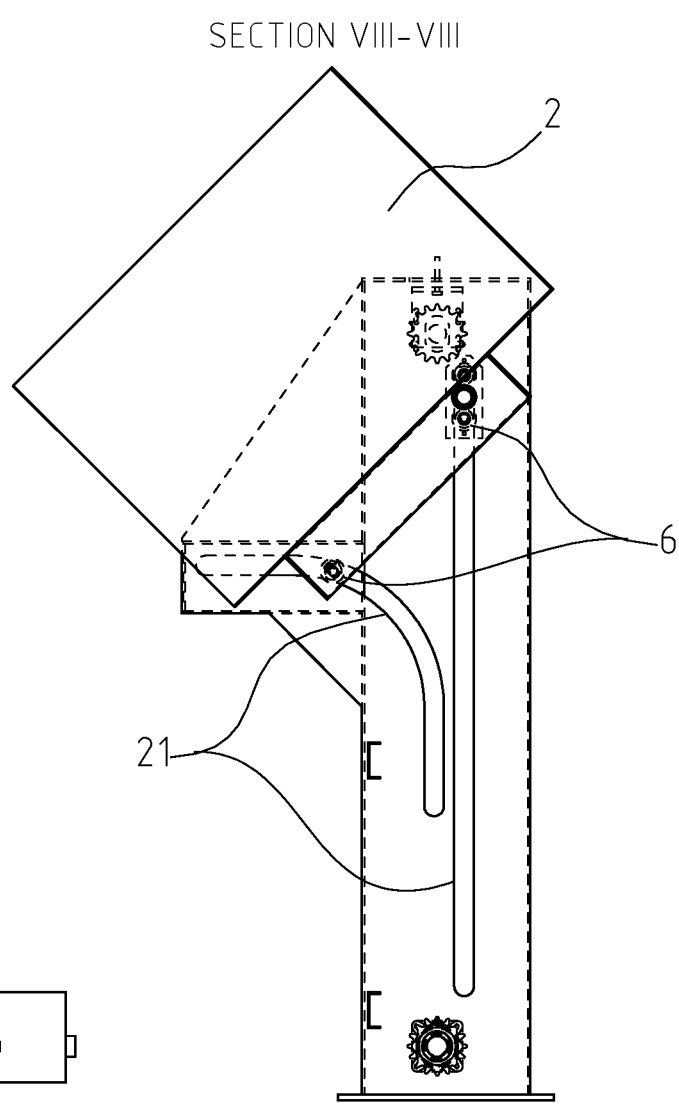
FIG. 16A
FIG. 16B

SYSTEM AND METHOD FOR BULK MATERIAL DUMPING

BACKGROUND OF THE INVENTION

The present invention relates to the transporting, lifting, and unloading of bulk material.

In a typical bulk material processing system, the material is received in containers. To begin processing the material, it is often removed from the container and loaded into the first step of the processing system. While manual labor is sometimes used for this purpose, it has been found far more efficient to rotate the entire container and dump the material out using mechanical equipment. There are several common existing systems available to perform this task including various hydraulic dumpers, skip hoists, and column dumpers. Limiting characteristics of these systems inherent to their design include discharge height capability, high ceiling and large floor space requirements, capacity restraints, and slow, inefficient operation. These limitations impose many restrictions on the spaces and applications where they are used. Current systems typically consist of a frame element, drum/payload carrying element, drive system, and in some cases a track/guide system. The frame is typically a steel structure that provides support and mounting for the drum and drive components. The drum typically consists of a floor and three sides, with the fourth side and top remaining open to allow containers to be loaded into the drum, and for the container contents to be poured out after the drum has been inverted. Drive systems vary considerably, but all provide a powered method of inverting the drum. In all designs, the drive system used is a major determination of the characteristics of the design. Two main classes of drive systems exist in the current market; compression member systems, embodied most commonly as those which use hydraulic cylinders to transmit the driving forces in compression. The other class is tension-only member systems, embodied most commonly as those which use a cable or chain to transmit the driving forces in tension. The function of the guide system function is to support the moving portion of the dumper as it is lifted and/or rotated. Guide systems vary widely within the various equipment designs, ranging from a pair of bearings on the simplest units, to intricate track and roller systems to guide lifting and rotating motion on more complex units.

The different classes of common design include hydraulic dumpers, skip hoists, and column dumpers. Hydraulic dumpers have a drive system consisting of hydraulic cylinders, a hydraulic pump unit, and hoses to route fluid. The pump unit must be capable of supplying sufficient hydraulic pressure and flow to the hydraulic cylinders to meet capacity and speed requirements of the unit. The cylinders mount between the frame and drum, and convert the power supplied by the hydraulic pump unit into motion of the drum. The drum is coupled to the frame using shaft and bearing referred to as the main pivot, around which the drum pivots. Hydraulic dumpers can be broken into two main categories: fixed main pivot units and units with a main pivot that vertically raises and lowers, referred to hereafter as a lift and dump. In fixed main pivot designs, the bearing and shaft are completely fixed in all 3 planes, only allowing the shaft to rotate within the bearing. This design is very effective when the desired discharge height is approximately the same height as the container being unloaded. It is however common that containers must be unloaded into various processing equipment that requires a minimum discharge height that is significantly higher than the height of the container. In the design of a fixed pivot dumper, the main pivot and drum must be constructed above the discharge height, resulting in a drum that is much taller than the container it is dumping. As it is rotated, this very large drum creates several problems. The arc that the drum displaces as it rotates around the main pivot is very large, requiring significantly more floor space than in its down position. This large drum once rotated into the up position also requires a significant amount of space above the discharge height. Ceiling height requirements can be nearly twice the discharge height depending on factors such as dump angle and drum depth. The other notable problem is the increased force required to rotate the drum. As the lever arm of the drum gets longer, the mechanical advantage of the hydraulic cylinders is worsened. Because of these problems exhibited at higher discharges, fixed main pivot dumpers are generally limited to around an eight-foot discharge height.

Hydraulic lift and dump systems offer some improvement in discharge height capability and space requirements over the fixed pivot dumper. The design is very similar to the fixed pivot dumper, with the addition of a sub-frame that moves vertically which the main pivot, drum, and rotation cylinders are attached to. An additional hydraulic cylinder is used to raise and lower the sub-frame. The design allows increased discharge heights to be attained through the vertical travel of the sub-frame, rather than increasing the drum size. The major limitation of this design is related to column buckling and hydraulic cylinder construction. In order to reach extended discharge heights while maintaining a small drum, a lift cylinder with a long stroke must be used. Due to cylinder capacity related to buckling a long slender cylinder rod, the rod & bore size must be increased in order to increase stroke length. The result of the described limitations is that this type of dumper its typically limited to around a 15 ft maximum discharge height before cylinder and pump requirements become impractical.

A variation of the hydraulic lift and dump that has been used to extend the discharge height capability is to fix a sprocket or sheave over the top of the lift cylinder, and run a length of chain or cable attached to the frame over the top of the sprocket (or sheave) and back down to the sub-frame. This arrangement causes the sub-frame to lift twice the stroke of the lift cylinder. Models of this type have been made capable of discharge in the 20-25-foot range.

Skip hoist systems are known for lifting extreme loads, and discharging them at extreme heights. Skip hoist systems have been constructed to discharge loads exceeding 10,000 lb at well over 100 feet. This is accomplished using a winch and cable drive system. Because the load is transmitted along the path by the cable tension member, skip hoists are not constrained by the column loading principle that limits hydraulic lift and dumps. In addition to their unique drive system, skip hoists use the winch system and a special track configuration to pivot their drum, the result being that no additional actuators need to be used to rotate the drum. A skip hoists frame is commonly composed of two columns, each supporting opposite sides of the drum (or skip). Each frame column has a tandem track that runs along the outside of it. The drum is guided along the track system typically using four track rollers mounted to the drum, each riding within one of the four tracks. At the discharge end of the frame, the two tracks on each frame side diverge from each other in a Y shape, with one branch continuing in a general upward direction, and the other running near horizontal. Through specific location of the track rollers and the diverging track, the drum is caused to pivot as it moves through this section, discharging its payload.

Despite their many advantages, current skip hoist systems have a few big limitations. The first is that some portion of the drive system is always located directly above the path of the drum, requiring additional overhead clearance. In most cases, the entire motor and winch system is mounted to the top of the frame, above the path of the drum. These units may require several feet of additional frame height, and in many scenarios make it difficult to maintenance the drive system. In a few cases, skip hoist design has been improved by mounting the motor and winch onto the side of the frame, so that only the drive cable needs to be routed above the drum. While this does offer improvement over traditional skip hoist frame height, it is still not optimal in many applications. The other identified limitation of a skip hoist is that although it can be made to lift a skip over 100 feet, due to its drum rotation mechanism, each unit can only discharge its payload at one location along the track, near the top.

Column dumpers make up a third class of equipment of similar application. Column dumpers have a unique frame with only one vertical column that supports the drum and drive. The drum is located to one side of the frame, with an arm extending from frame to attach the drum. The arm is commonly supported within the frame by a linear bearing riding up and down a rod running the length of the frame. The drum and arm are typically driven up and down along the frame using a single roller chain drive, driven by a sprocket, reducer and motor at the top of the frame. Various mechanisms are used to rotate the drum. Generally, the drum is mounted on the lifting arm so that it can pivot independently around the arm. To pivot the drum, typically some embodiment of a lever arm attached to the drum interacting with a pin fixed to the frame causes the drum to pivot about the lifting arm and discharge its contents.

Column dumpers offer significant benefits within their realm, including a very small footprint, and minimized overhead height. The major drawback of column dumpers is that, with their single-column frame design and load extended beyond the support base, they are currently not used and considered not well suited for the capacities that hydraulic dumpers and skip hoist units are utilized in. In addition, similar to the pivot mechanism of the skip hoist, the stationary pin and lever only operate at a single set location for the drum to discharge.

Accordingly, there remains room for improvement in the field of bulk material transporting, lifting and dumping.

SUMMARY OF THE INVENTION

The bulk material handling system of the present invention provides an improved system and method for transporting, lifting and/or dumping bulk material. A Frame element, payload carrying element, guide system, drive system and diversion system make up the primary sub-systems that work in unison to carry out the various functions of this bulk material handling process.

In one embodiment, the frame element includes a number of vertical columns joined together as one main structure entity, which will provide a stable base, structural support and attachment surfaces for the other sub-systems employed. In embodiments where multiple frame columns are employed to evenly support the payload carrying element and unique drive system, this unit may be optimized to service high-capacity applications currently served by skip-hoists and the like.

In one embodiment, the payload carrying element includes a lifting floor, sidewalls, and structural framework that is configured to contain the material being processed.

In one embodiment, the guide system will include a number of components that interact with the payload carrying element to control the motion of the payload carrying element by restricting its motion to a defined path.

In one embodiment, the diversion system includes a number of diverter mechanisms that are located at a number of instances where the guide system path branches. Each diverter mechanism enables the payload carrying element to be selectively directed onto the desired path branch. In this manner, the payload carrying element may be directed to a plurality of destination and orientations along the guide system.

In one embodiment, the drive system includes a number of prime movers, drive shafts, sprockets and tension only members to produce mechanical power and transmit it to the payload carrying element to cause motion of the payload carrying element. By utilizing a tension-only member to transmit the drive power to the payload carrying element, the resulting benefit is that a drive system can be made to service a very tall unit without the exponential increase in component size and strength as is the case with drive systems relying on compression members to transmit lifting power.

In one embodiment of the present invention, one cycle of the process may be carried out as follows. A container of bulk material is loaded into a drum entity serving as the payload carrying element in the system. The drive system is then actuated, applying force to the tension only member and initiating a lifting motion of the drum and payload. The drum travels along the guide system mounted to the frame as it is lifted. The guide system fully constrains the motion of the drum, only allowing motion in the intended direction(s) of travel. At one or more specified locations as the drum is lifted along the guide system, a diverter mechanism and corresponding branch in the guide path may be used to cause the upper portion of the drum to diverge from its original path onto an alternative path, causing the drum to rotate to a degree that allows the payload to discharge down, out of the drum. Before the completion of each process cycle, the drum may be returned to its original orientation, and driven back down the main path of the guide system to its original location, ready to be loaded with fresh bulk material and cycled again.

In one embodiment, if the prime mover and drive system components that span between the frame columns are located below or to the side of the path of the payload carrying element and the payload carrying element is made as small as possible to contain the required product, it will be possible to maximize the discharge height of the unit, given a specific height restriction of the complete unit in its raised state.

In one embodiment, by utilizing a small payload carrying element, and allowing the upper portion of the payload carrying element to travel toward the discharge zone as it rotates, it will be possible to significantly reduce the floor space hazard zone occupied by this process.

In one embodiment, the drum entity may be loaded with loose bulk material and constructed in such a way to contain the loose material without use of a container.

In one embodiment, the payload carrying element may take various forms, including but not limited to pallet forks, mount to interface with a container, or container clamping mechanism.

In one embodiment, the diverter mechanism and corresponding branch in the guide path may be duplicated at various points along the guide system to allow a multitude of dump locations or path options on a single unit.

In one embodiment, the entire payload carrying element may be diverted onto the one or more alternative paths of the guide system, causing the payload carrying element to travel to an alternative location without fully rotating and discharging the contained payload.

In one embodiment, resulting from the capability of the guide system and diverter system to guide the payload carrying element horizontally or diagonally away from the main lifting path, this process may be configured to discharge material at a significantly greater distance from the main lifting path than many alternative designs where the payload carrying element may only travel in a straight line, vertically.

In one embodiment, the described process may be used in alternative orientations to accomplish similar tasks. For example, this process could be configured to travel predominantly horizontally or diagonally for the purpose of transporting bulk material across a horizontal distance.

These and other objects, advantages, and features of the invention will be more fully understood and appreciated by reference to the description of the current embodiment and the drawings.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

BRIEF DESCRIPTION OF THE DRAWINGS

FIG. 5A is a back view depicting the guide system and diversion system.

FIG. 5B is a sectional view taken along line I-I of FIG. 5A.

FIG. 11A is a back view of a configuration with multiple alternative track branches.

FIG. 11B is a sectional view taken along line V-V of FIG. 11A.

FIG. 15A is a side view depicting a configuration using a drive system with the tension only members spanning between the frame columns.

FIG. 15B is a sectional view taken along line VII-VII of FIG. 15A.

FIG. 16A is a back view of the guide system of an alternative embodiment with the drum in a raised and rotated position.

FIG. 16B is a sectional view taken along line VIII-VIII of FIG. 16A.

DETAILED DESCRIPTION OF THE CURRENT EMBODIMENTS

Figure 1:
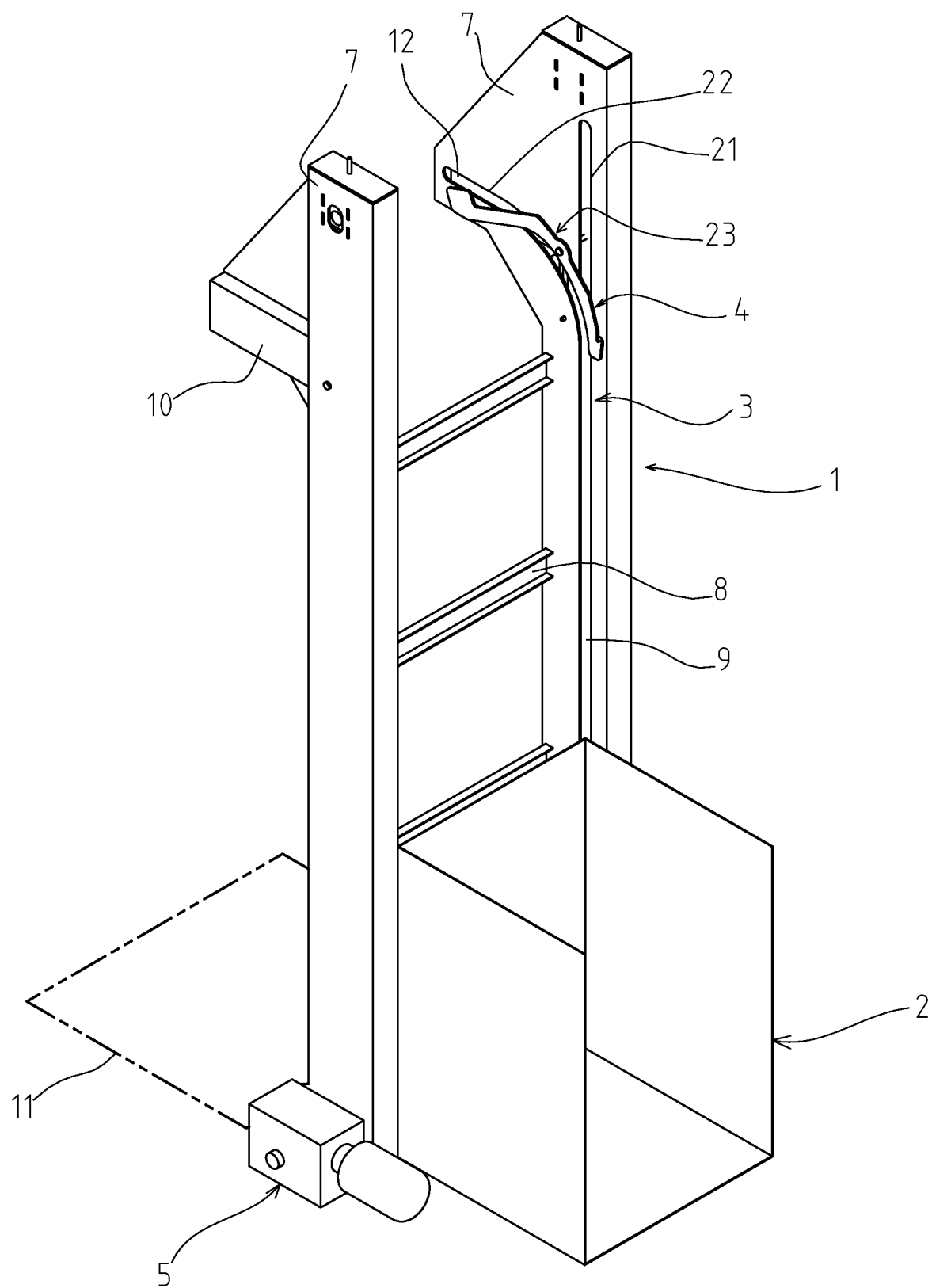
FIG. 1 is an isometric overview of the major systems.

The present invention provides an improved system and method for discharging contained or loose material. One embodiment of these systems is illustrated in FIG. 1. In the illustrated embodiment, there are five elements that make up this system: frame element 1, payload carrying element 2, guide system 3, diversion system 4, and drive system 5.

Directional terms such as "vertical," "horizontal," "top," "bottom," "upper," "lower," "inner," "inwardly," "outward," and "outwardly," are used to assist in describing this system based on the orientation of the embodiments shown in the illustrations. The use of directional terms should not be interpreted to limit the use of this system to any specific orientation(s).

The frame element 1 will constitute any structural entity that is supported by the surrounding environment, which functions to provide mounting and support for the other elements in the system. The payload carrying element 2 will constitute any structural entity that is moved by the drive system 5 with the intended purpose of containing and transporting a payload of material which may be in a container or loose, that will be subject to this process. The payload carrying element 2 will employ a plurality of guided elements 6 as points of contact with the guide system 3 and diversion system 4. The payload carrying element 2 will also include a structural attachment point for coupling to the drive system 5. Throughout this description, the payload carrying element 2 may be referred to as the "drum" or "drum assembly", as is a common embodiment. The guide system 3 will include a number of components attached to the frame element 1 with the intended function of directly interacting with the guided elements 6 so as to provide sufficient control of the path of the payload carrying element 2. Throughout this description the guide system 3 may be referred to as the "track" or "track assembly", as is a common embodiment. The diversion system 4 will include a number components related to the guide system 3 with the intended function of directing the guided elements 6 from the single main path 21 of the guide system onto one of one or more alternative branch paths 22 to produce the desired motion of the drum 2. The drive system 5 will include a number of components involved to create and transmit mechanical power to the payload carrying element 2 to produce motion of the payload carrying element 2.

Shown in the illustrated embodiment of FIG. 1, the frame element 1 of the illustrated embodiment consists of two or more frame columns 7, that are tied together by a plurality of frame crossmembers 8. The frame columns 7 may be positioned on opposing sides of the drum 2, allowing sufficient space that the drum 2 fits between the frame columns 7. Each frame column 7 may be constructed to have a generally rectangular cross-section with a hollow, unobstructed cavity at the center, referred to as the frame column cavity 9. Each frame column may have one or more track support members 10 protruding from the main frame column 7, typically toward the discharge zone 11. The track support members 10 may also have a hollow cavity at their center, typically of a rectangular cross-section that connects to the main frame column cavity 9, referred to as the track support member cavity 12. The track support members 10 may be used at each instance of the frame 1 where an alternative track path 22 is desired.

Figure 2:
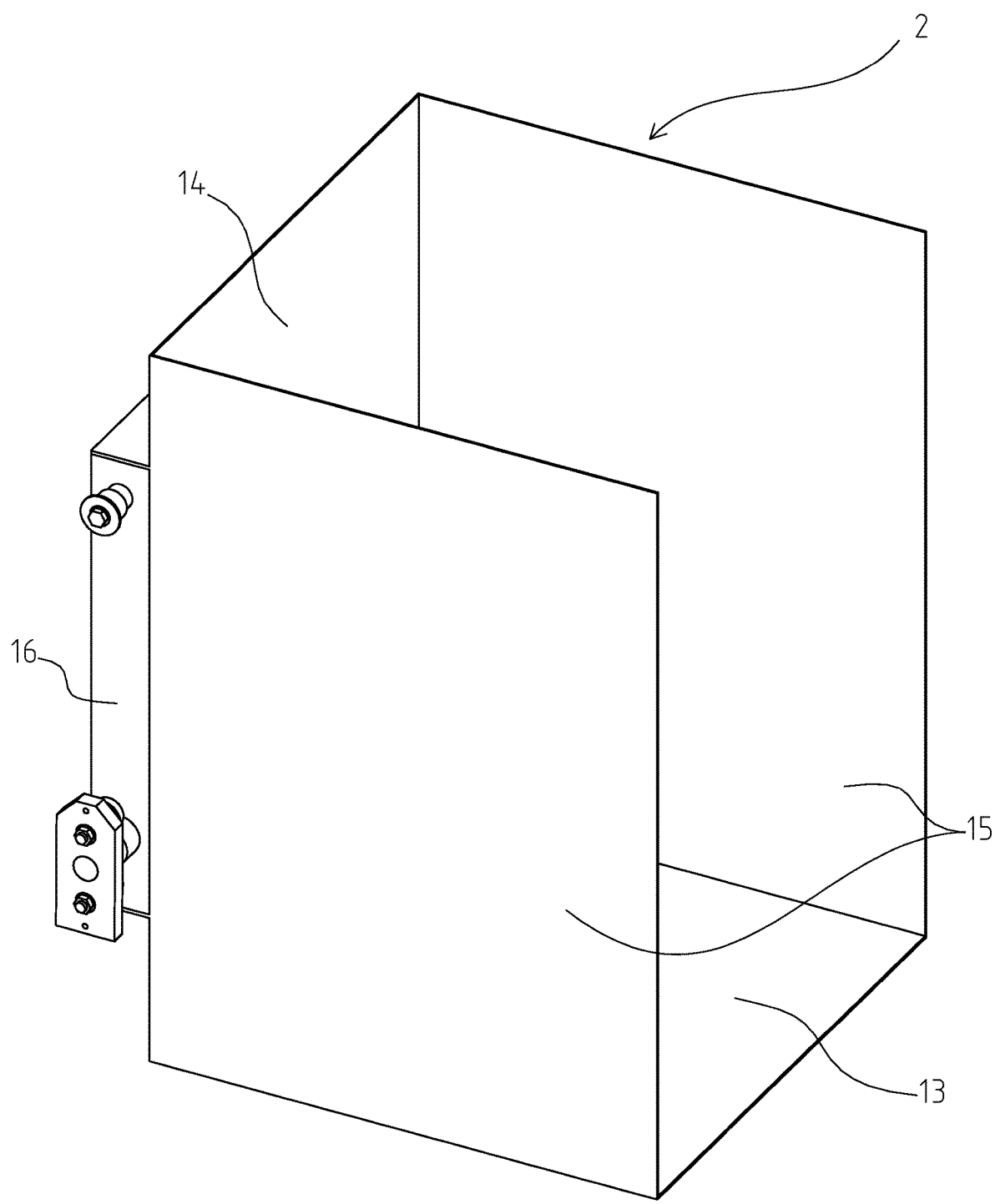
FIG. 2 is an isometric view of the payload carrying element.
Figure 3:
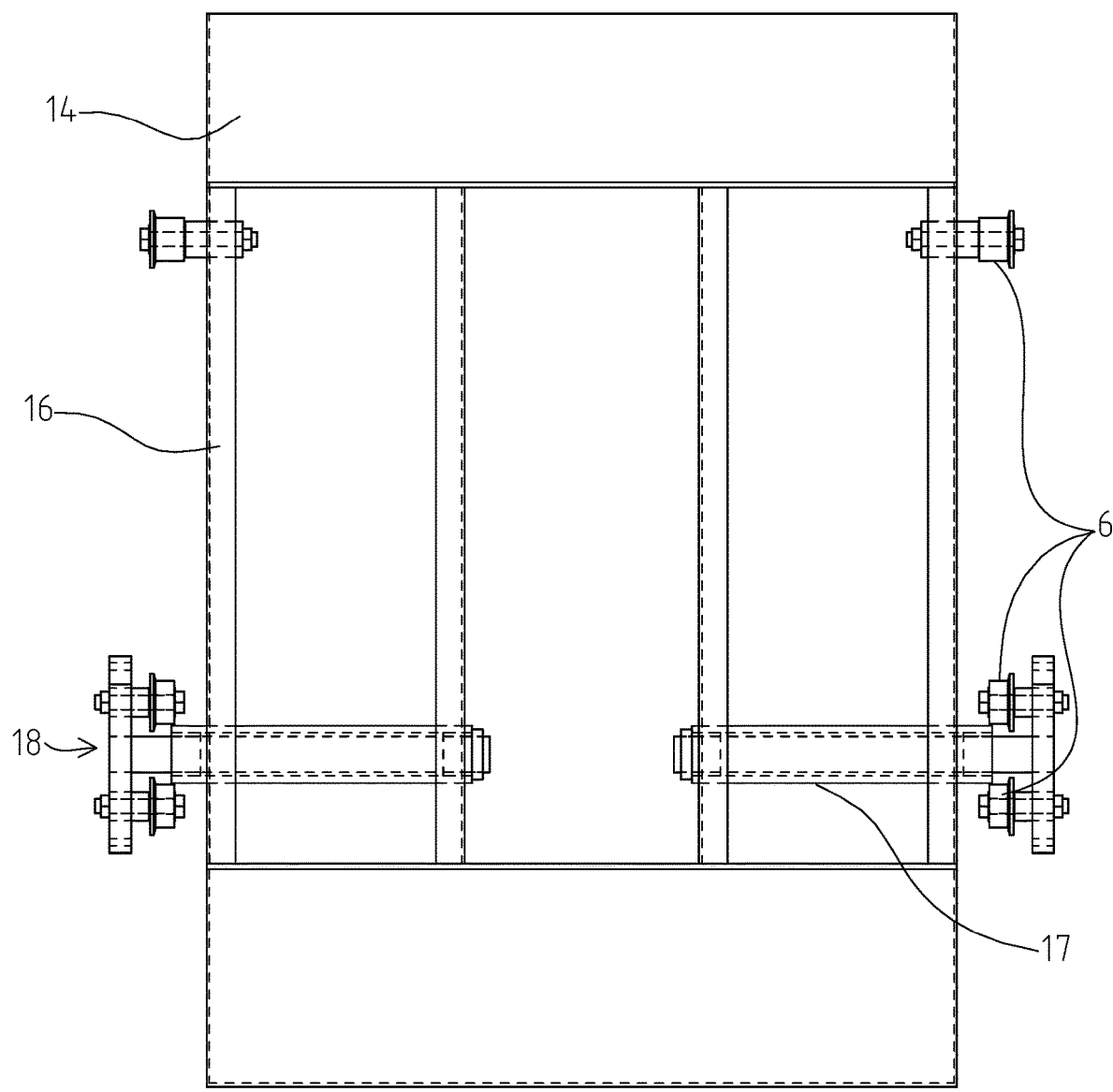
FIG. 3 is a backside view of the payload carrying element depicting structural elements, lower pivot assemblies and guided element locations.
Figure 4:
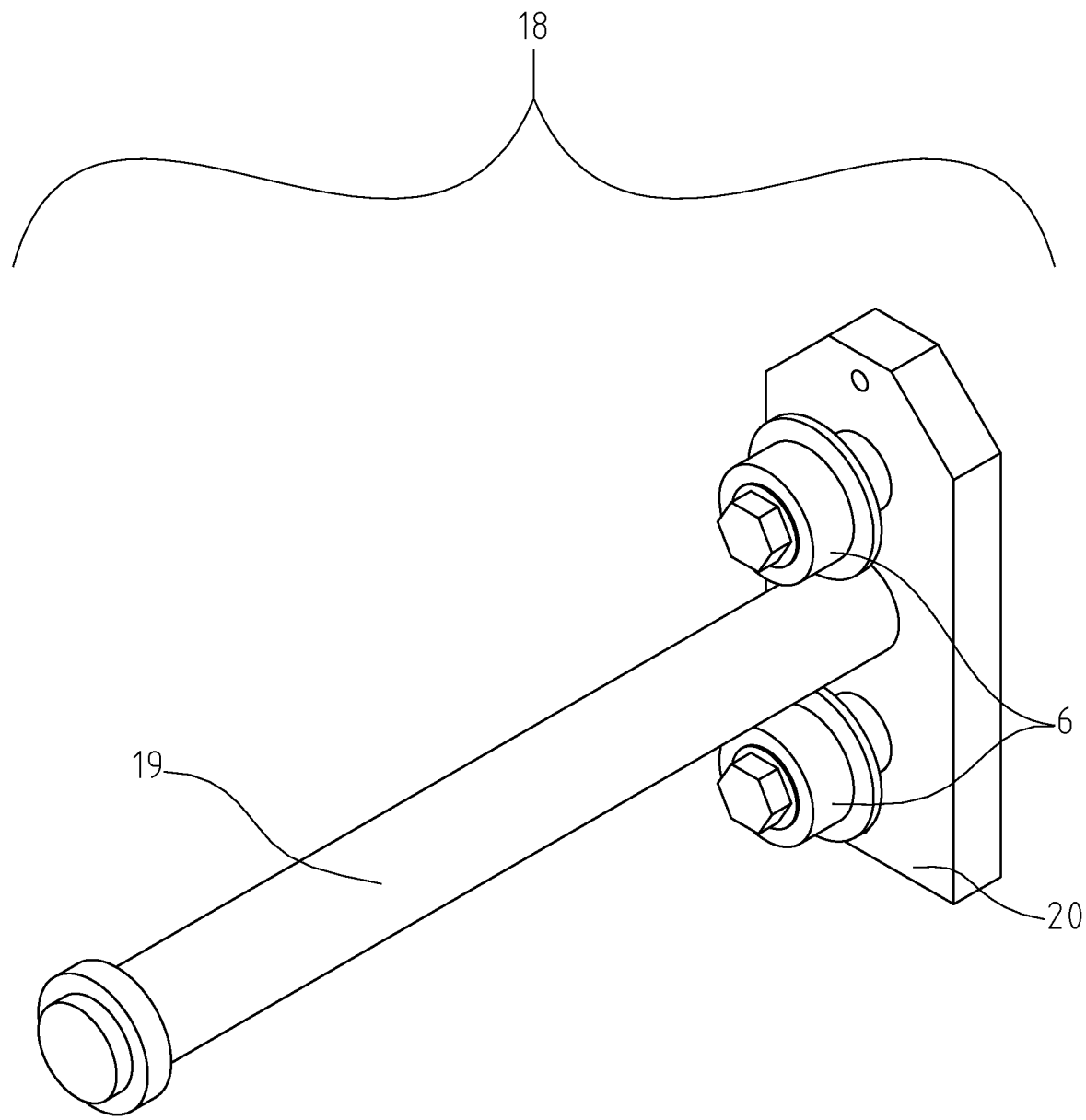
FIG. 4 is an isometric view of the lower pivot assembly.

Shown in the illustrated embodiment of FIG. 2, the drum assembly 2 is a box-like container which may be constructed to have a floor or lifting surface (13), backwall 14, and sidewalls 15. The drum 2 has no top to allow for the contents to be dumped out when it is inverted. Shown in the illustrated embodiment of FIG. 3, a drum frame structure 16 may added to the outside of the back wall 14 to increase the strength and rigidity of the drum 2 and allow guided elements 6 to be attached to the drum 2. Guided elements 6 will include but not be limited to bearings, track rollers, wheels and sliding elements that may be constructed from low-friction materials. Near the bottom of the illustrated drum frame structure 16 protruding from either side is a round hollow tube with a bearing surface on the interior, referred to as the pivot tube 17. Attached to the drum frame structure 16, installed through the pivot tubes 17 are the lower pivot assemblies 18. Shown in the illustrated embodiment of FIG. 4, each lower pivot assembly 18 may consist of a lower pivot shaft 19, lower pivot body 20, and one or more guided elements 6.

The guide system 3 will consist of a number of main paths 21 (e.g. one or more) and in some cases, one or more alternative paths 22 that intersect a number of the main paths 21. Shown in the illustrated embodiment of FIG. 5, long continuous slots may be cut from a wall of each frame column 7. The edges of these cutouts may serve as the guiding surfaces 43 of the guide system 3. In addition to guiding the guided elements 6, these cutout paths pass completely through one wall of the frame columns 7, allowing un-obstructed access into the frame column cavity 9. The alternative path(s) 22 of the guide system 3 may be similarly cut from a wall of the track support member 10 portion of the frame 1.

Shown in the illustrated embodiment of FIG. 5, the diversion system 4 may include a plurality of diverter mechanisms 23. In the illustrated embodiment of FIG. 6, each diverter mechanism(s) 23 may consist of a pivoting diverter member 24 mounted parallel to the surface of the frame column 7 that the guide system 3 slots are cut from. In the illustrated embodiment of FIG. 7, the diverter member 24 may be made up of two sections, a leading portion 25 of the diverter member 24 and a follower portion 32 of the diverter member 24. Shown in FIG. 6, the inner surface of the leading portion 25 of the diverter member 24 is profiled to match the outer surface of the alternative path 22 at the intersection area. The diverter pivot 26 of the diverter member 24 is attached to the frame 1, and located such that the alternative path 22 and diverter member 24 guide surfaces may align. Diverter hard stops 27 may be implemented in various forms, shown here as short pegs protruding from the frame column 7. A diverter actuator 30 may also be implemented in various common forms, including but not limited to linear or rotary actuators powered by electric, pneumatic, hydraulic or other power sources. The diverter actuator is shown here as a linear actuator connected between the frame column 7 and the diverter member 24.

Figure 6:
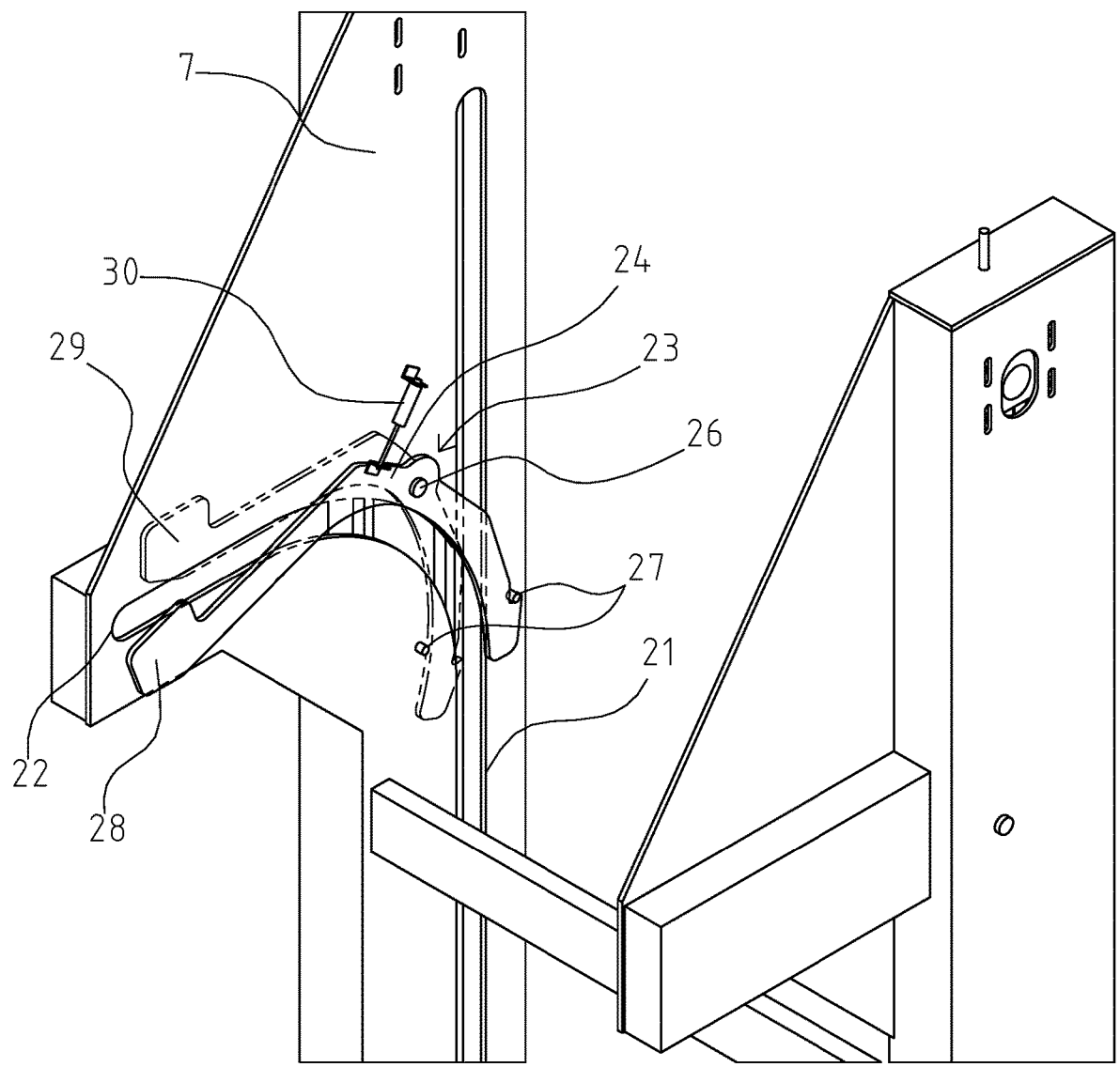
FIG. 6 is an isometric close-up view depicting the diversion system in its deployed and deactivated states.

In the illustrated embodiment of FIG. 6, the diverter member 24 is shown in its two critical positions: a deployed state 28 (solid lines) and a deactivated state 29 (broken lines). In its deployed state 28 the diverter member 24 intersects the main path 21. In its deactivated state 29 it does not intersect the main path 21 and is instead positioned so that the entire diverter member 24 body is on one side of the main path 21, and may be positioned to block the alternative path. In some embodiments diverter hard stops 27 may be used to limit the motion of the diverter member 24 so that it may not rotate past the critical deployed 28 and deactivated 29 positions.

Figure 8A:
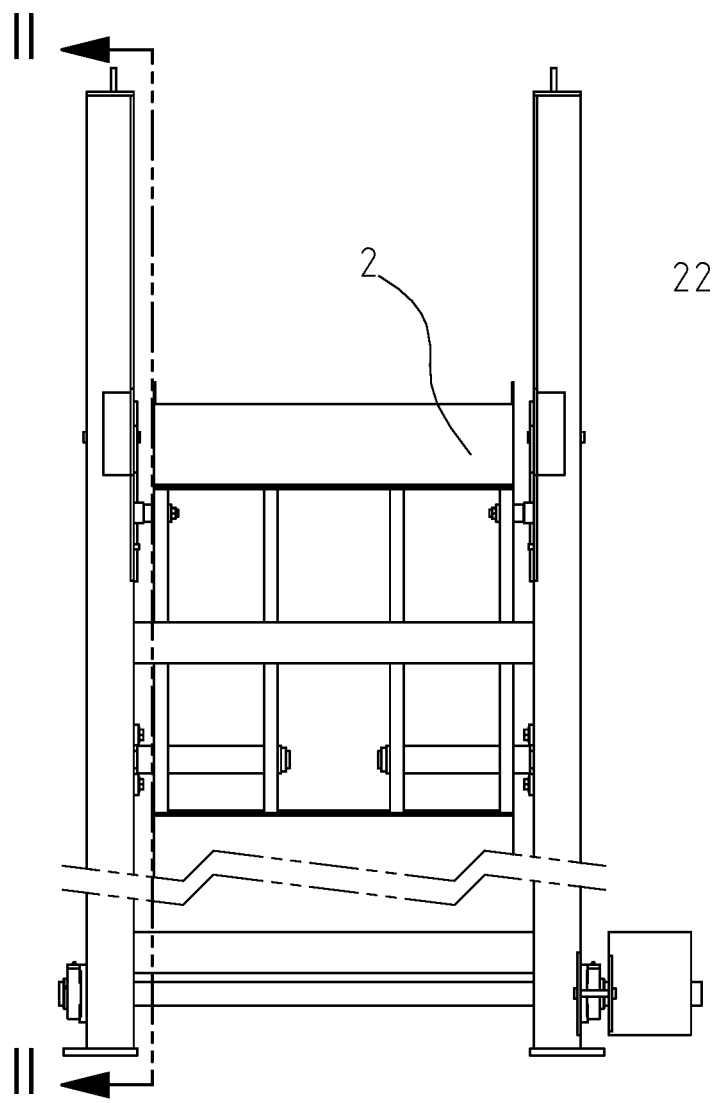
FIG. 8A is a back view depicting the guide system and diversion system, with the diversion system in the deployed state.
Figure 8B:
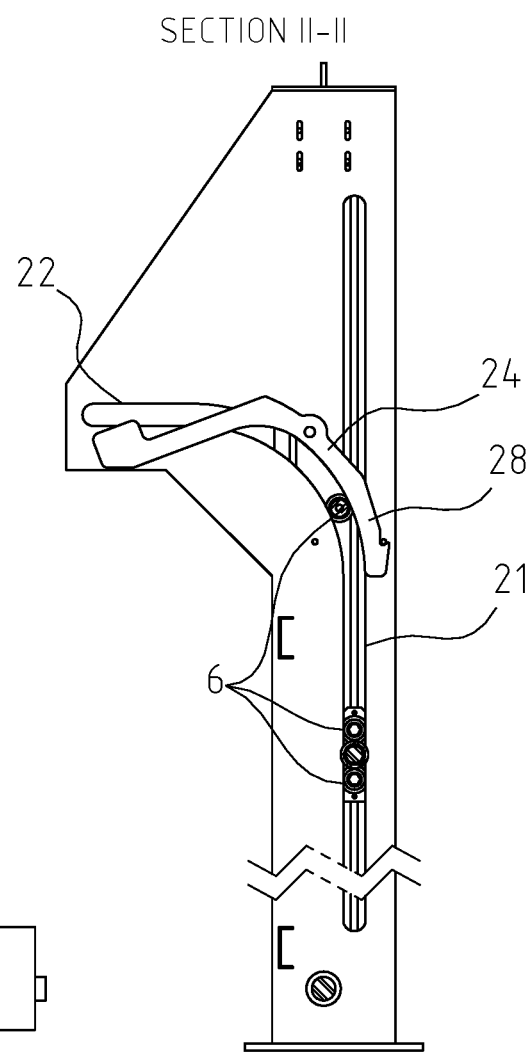
FIG. 8B is a sectional view taken along line II-II of FIG. 8A.

In the illustrated embodiment of FIG. 8, the diverter member 24 is shown in its deployed state 28. In its deployed state 28 the leading portion 25 of the diverter member 24 blocks the main path 21, directing the guided element 6 into the corresponding alternative path 22 of the guide system 3.

Figure 9A:
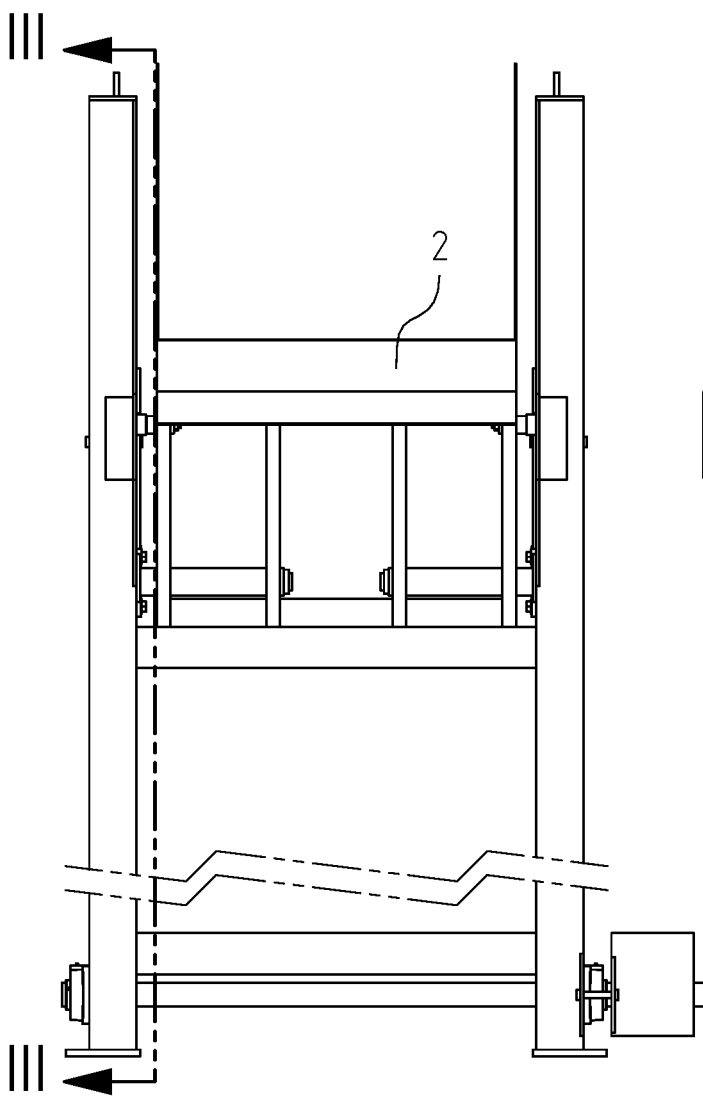
FIG. 9A is a back view depicting the guide system and diversion system, with the diversion system in the deactivated state.
Figure 9B:
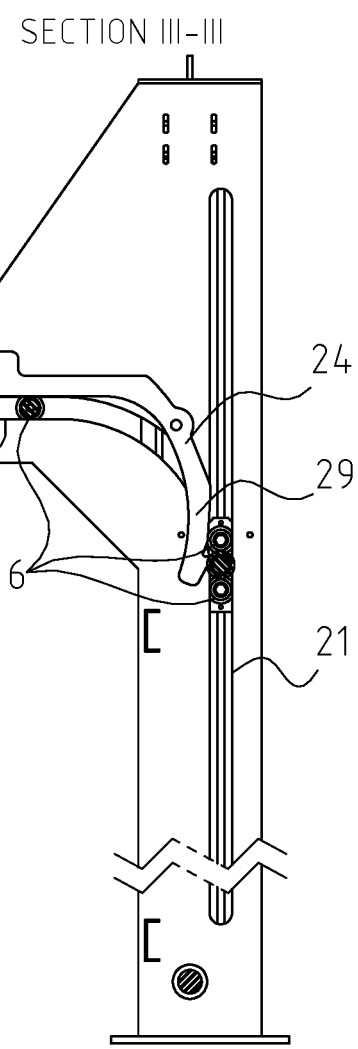
FIG. 9B is a sectional view taken along line III-III of FIG. 9A.

Shown in the illustrated embodiment of FIG. 9, by various methods of actuation, the diverter member 24 may be converted to a deactivated 29 state so that the entire diverter member 24 body is on one side of the main path 21 and blocks the alternative path 22. In this state, the diverter member 24 will cause or allow the guided elements 6 to continue on the main path 21.

Various methods of actuating the diverter mechanism 23 may be implemented. Shown in the illustrated embodiment of FIG. 7, the material of the diverter member 24 may be distributed so that the center of mass of the diverter member 31 is offset to one side of the diverter pivot 26. The effect will be to create a moment about the diverter pivot 26, causing the diverter member 24 to naturally rotate back to one of the critical positions using gravitational force, where it may be stopped by a hard stop 27. Other possible methods of returning the diverter mechanism 23 to a desired critical position include springs or actuators.

Figure 7:
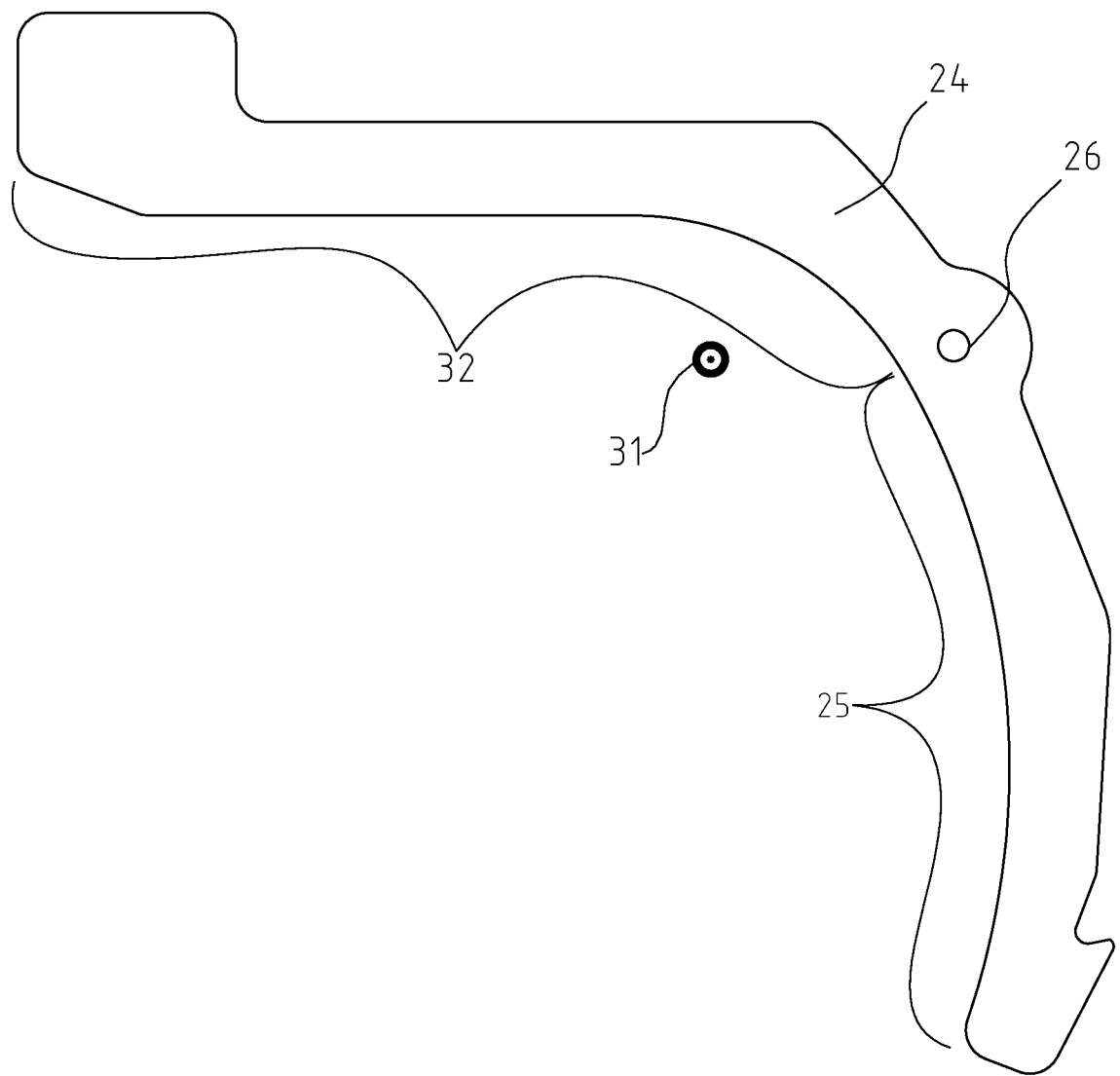
FIG. 7 is a front view of the diverter member.

Shown in the illustrated embodiment of FIG. 7, a follower portion 32 of the diverter member 24 may be included as a part of the diverter member 24. A follower portion 32 of the diverter member 24 may function to actuate the diverter mechanism 23 from the motion of a guided element 6 as it travels along a path. Shown in the illustrated embodiment of FIG. 8, the follower portion 32 of the diverter member 24 will extend to one side of the diverter pivot 26 and be shaped so that it gradually crosses the alternative path 22 in the deployed state 28 of the diverter member 24. Shown in the illustrated embodiment of FIG. 9, as the guided element 6 travels along its intended path, it will force the follower portion 32 of the diverter member 24 out of its path, causing the diverter member 24 to rotate about the diverter pivot 26, to its deactivated position 29. The length of the follower portion 32 of the diverter member 24 may be extended to hold the diverter member 24 in the deactivated position 29 while guided elements 6 trailing behind the guided element 6 bypasses the alternative path 22 and continues along the main path 21. This type of actuation is useful to cause repeated sequential diversion of the guided elements 6.

Shown in FIG. 6, in some embodiments of the diverter mechanisms 23 a controllable diverter actuator 30 component may be used exclusively or in conjunction with any of the actuation methods previously described to control the position of the diverter member 24. The diverter actuator 30 can be used to index the diverter mechanism 23 to either its deployed 28 or deactivated 29 states. Use of this type of actuation will enable intelligent control of the diversion system 4, allowing an operator or program to select any possible path of the guide system 3 for the guided elements 6 to follow. Diverter hard stops 27 may be used to provide robust support of the diverter member 24 at its critical positions, allowing for considerably lighter-duty diverter actuators 30 to be used.

Figure 10A:
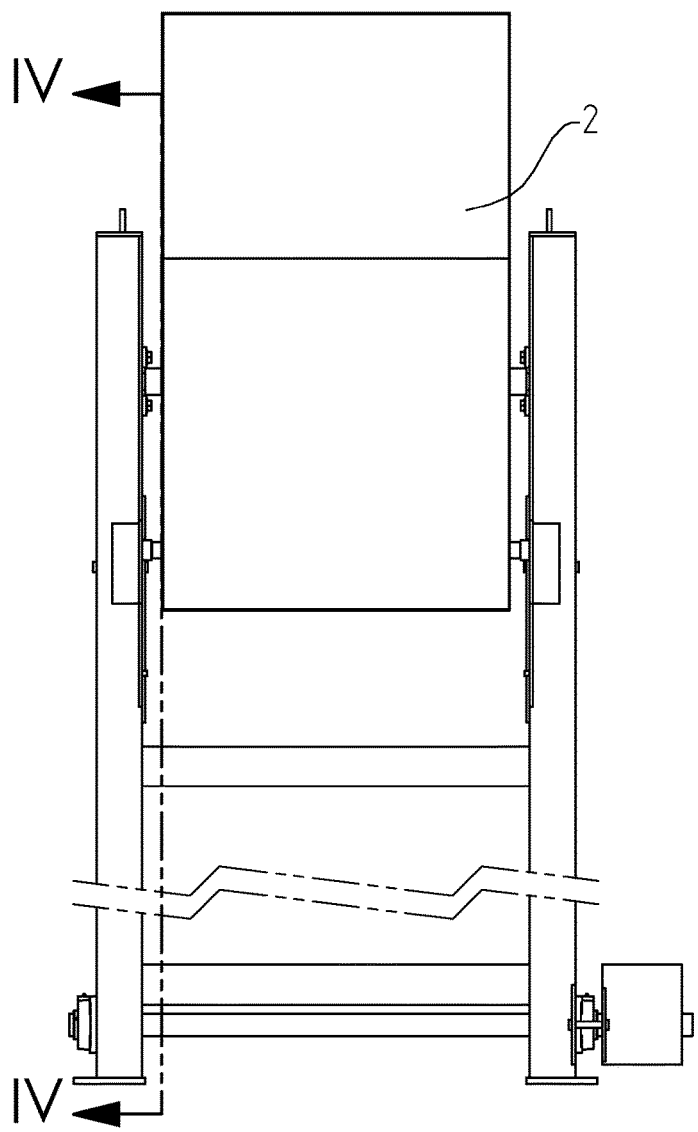
FIG. 10A is a back view of the guide system and diversion system with the drum in a raised and rotated position.
Figure 10B:
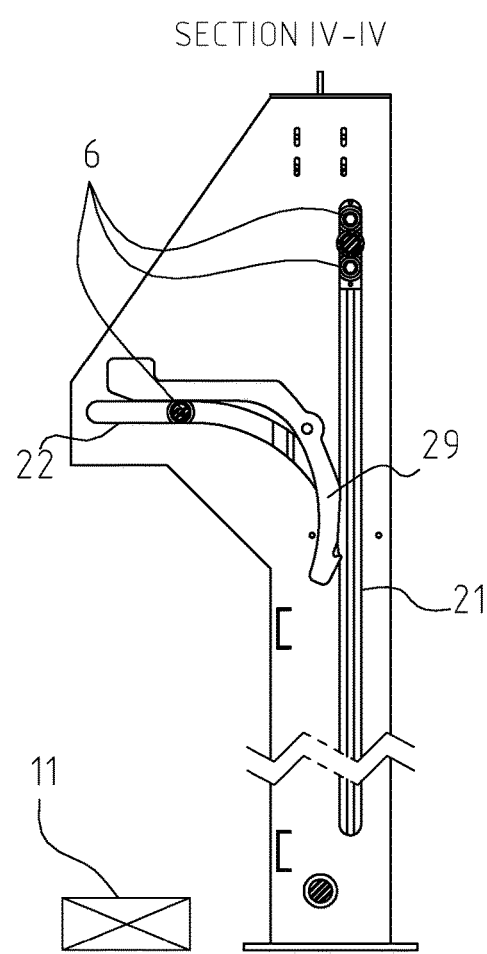
FIG. 10B is a sectional view taken along line IV-IV of FIG. 10A.

The various methods of selective diversion of the guided elements 6 described can be used to re-direct the drum 2 to a plurality of possible destinations and orientations. In the illustrated embodiment of FIG. 10, through diversion of the upper drum guided elements 6 onto the non-vertical alternative path 22, and allowing the lower guided elements 6 to continue on the main path 21 for a specified distance, the lower guided elements 6 are allowed to surpass the upper guided elements 6, causing the drum 2 to be rotated as it is drawn along the guide system 3, thereby changing the orientation of the drum 2. During the rotation of the drum 2 the upper guided elements 6 may travel horizontally in the direction of intended payload discharge zone 11. The horizontal distance traveled by the upper portion of the drum 2 and guided elements 6 can be used to advantageously increase the distance between the frame entity 1 and the payload discharge zone 11.

Figure 12:
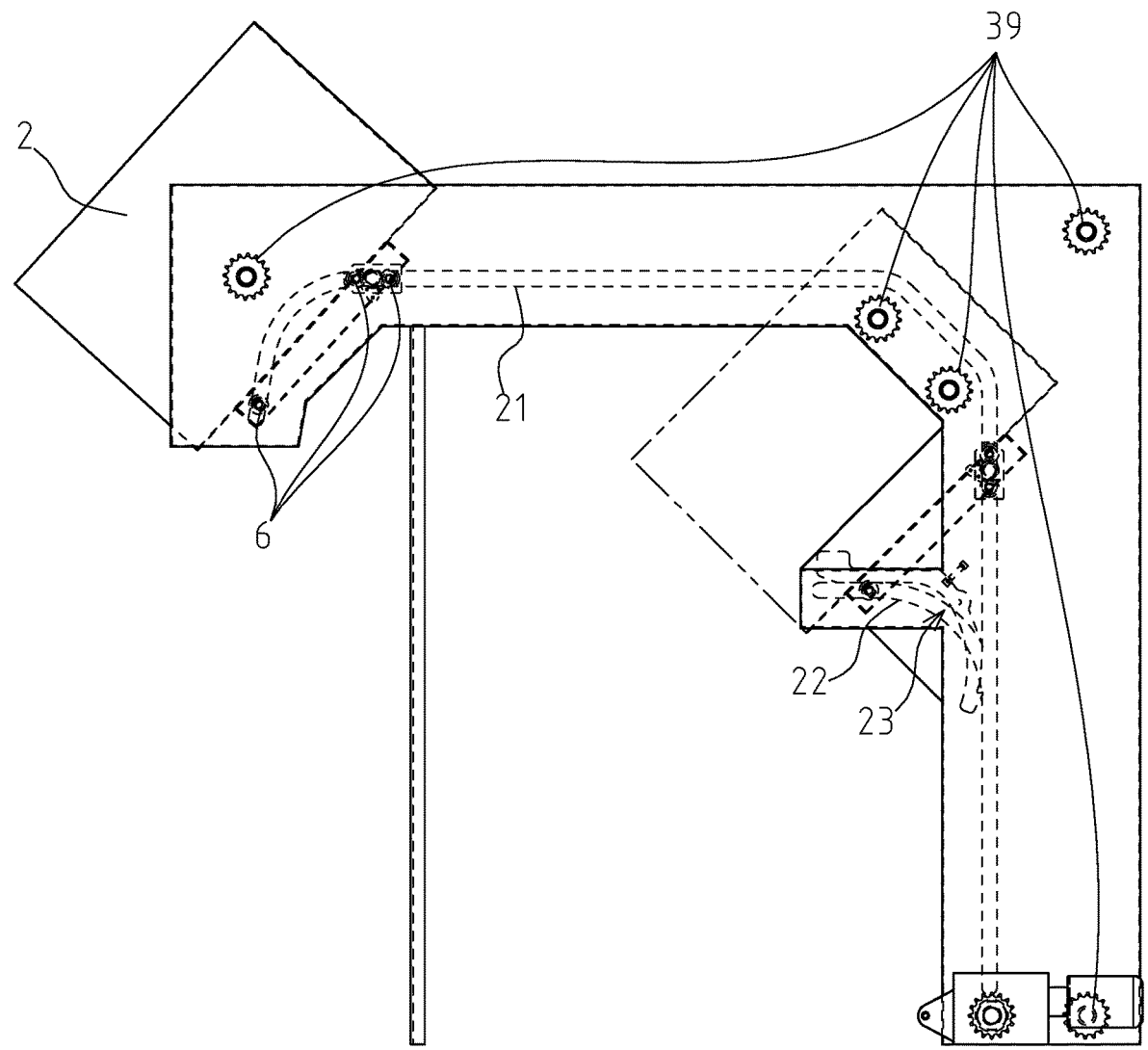
FIG. 12 is a side view of a configuration with an alternative track branch and a non-straight, non-vertical main path.

In the illustrated embodiments of FIG. 11 and FIG. 12, two different guide system 3 configurations are shown, each illustrating a distinctly different way that the described system may be used to cause the drum to be guided to a plurality of possible destinations and orientations. Shown in FIG. 11 is a guide system 3 implementing a plurality of alternative path 22 branches. For each alternative path 22, a separate diverter mechanism 23 may be used at each alternative path 22 intersection to control the path taken by the guided elements 6 at that intersection. At each of the alternative path 22 sections, the drum 2 may be caused to rotate using methods previously described, or may be allowed to bypass that alternative path 22 using a selective diverter mechanism 23 and continue along the main path 21.

Shown in FIG. 12, a guide system 3 implementing an alternative path 22 branch, as well as a non-straight and/or non-vertical main path 21 is shown. With this configuration of the guide system 3 the drum 2 may be caused to rotate at the alternative path 22 section, or, if the alternative path 22 is bypassed using a selective diversion system 4, the drum 2 may continue along the main path 21, with all guided elements 6 attached to the drum 2 remaining on the main path. The drum 2 may be caused to undergo various orientation and positional changes, based on the profile of the main path 21.

Shown in FIGS. 16A and 16B, some embodiments may capture the upper and lower guided elements 6 in separate main paths 21. In this configuration the path of the drum 2 may be controlled by the shape of the separate main paths 21 and a diversion system 4 may be omitted. For example, and as perhaps best shown in FIG. 16B, the upper end of the drum 2 may be captured in a curved main path 21 and the lower end of the drum 2 may be captured in a linear main path 21. During operation, the upper end of the drum 2 may follow the curved main path 21 and the lower end of the drum 2 may move along the linear main path 21 to a point above the upper end, thereby pivoting the drum 2 and dumping the payload from the drum 2.

It is understood that in some embodiments, no diversion system 4 may be implemented, common if there is no alternative path 22 that intersects a main path 21. It is understood that the methods described and illustrated in FIG. 11, FIG. 12, and FIG. 16 may be combined in various ways, and that any number of alternative paths 22 or main paths 21, following any profile may be implemented in a specific embodiment to produce the desired drum 2 positions and orientations.

The drive system 5 will consist of a number of components employed in creating and/or transmitting mechanical power to the payload carrying element 2 to produce motion. It is identified that many various existing drive systems 5 may be used to drive the previously described process, each offering distinct set of characteristics. Several major qualities that are considered when selecting an optimal drive system 5 for this process including maximum lifting/travel distance, ability to evenly distribute loads to a plurality of frame columns 7, and ability to be constructed without impeding the drum 2 path or increasing the required ceiling height. The drive system 5 described here will offer a distinct benefit according to the criteria as compared to present alternative drive systems 5 when used as a part of the previously described process.

Drive systems 5 using a tension-only member 33 to transfer force to the drum 2 are capable of transmitting the force over a significantly greater distance without significantly increasing construction of the components, because tension-only 33 member drive systems are not limited by the column load of a compression member used to transmit force in alternative drive systems. Tension-only member 33 drive systems 5 utilize a flexible entity that is not capable of transmitting significant compressive loads, but is capable of transmitting significant tensile loads to transmit the lifting load over any significantly long distances where column strength may otherwise be a factor.

Described here is a method of driving a payload carrying element 2 consisting of a prime mover(s) 34 and rotational element(s) 35 which drive(s) a tension-only member or two or more tension-only members 33 (as shown) coupled to opposing sides of the payload carrying element 2, in which all drive components may be positioned entirely below the uppermost path of the drum 36. The prime mover(s) 34 used typically produce a rotational power output. Depending on the specified payload of the unit, desired operation speed and prime mover 34 selected, in many cases the prime mover(s) 34 may be paired with a power converter 37 to adjust output speed and torque, as well as provide a reversable output. The rotational power is transferred from the prime mover 34 (or power converter 37 when used) to the driven rotational elements 38, which then transmit the rotational power, converted into linear power, to the tension-only members 33 that are engaged in the driven rotational elements 38. The tension-only members 33 that are transmitting linear power are coupled to the drum 2, resulting in the ability to produce linear motion of the drum 2. Idle rotational elements 39 may be used along the path of each tension-only member 33 to direct the linear power of the tension-only member 33.

In this way, the prime mover(s) 34 is coupled to the drum 2, so that as the driven rotating elements 38 are rotated in one direction, all tension-only member 33 strands are simultaneously driven, causing the drum 2 to travel between the driven rotational element 38 and various idle rotational elements 39. At any point, reversing the rotation of the driven rotating elements 38 will cause the linear motion of the drum 2 to reverse. If the rotation of the driven rotating elements 38 is held stationary, the position of the drum 2 will also be held stationary. Various types of prime movers 34 that produce a rotational power output may be used as a power source, including but not limited to electric motor, hydraulic motor, combustion engine, etc. Possible power converter 37 types may include but not limited to gear drives, chain drives, hydraulic power transmission, etc.

Figures 13A, 13B:
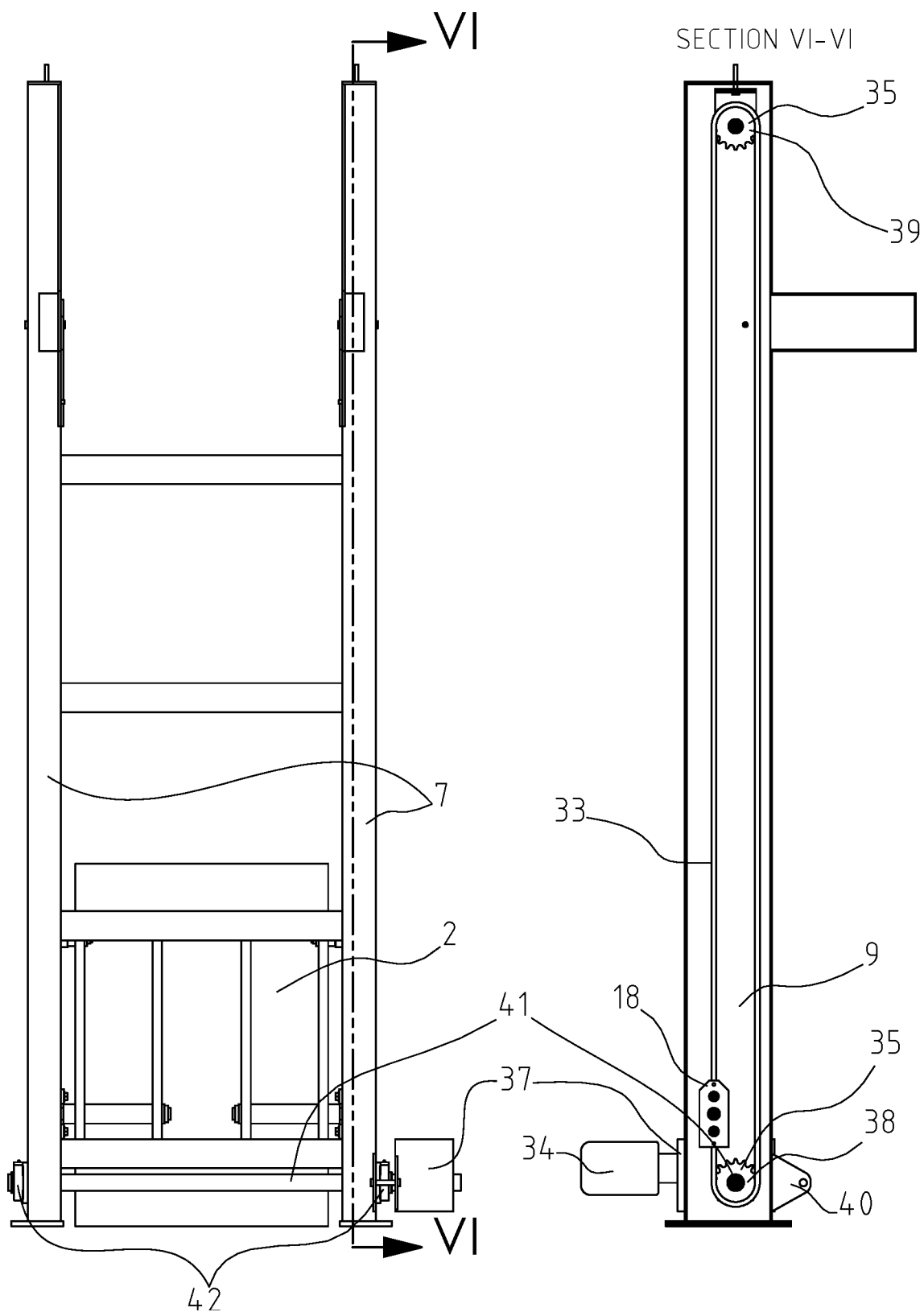
FIG. 13A is a back view depicting the drive system.
FIG. 13B is a sectional view taken along line VI-VI of FIG. 13A.
Figure 14:
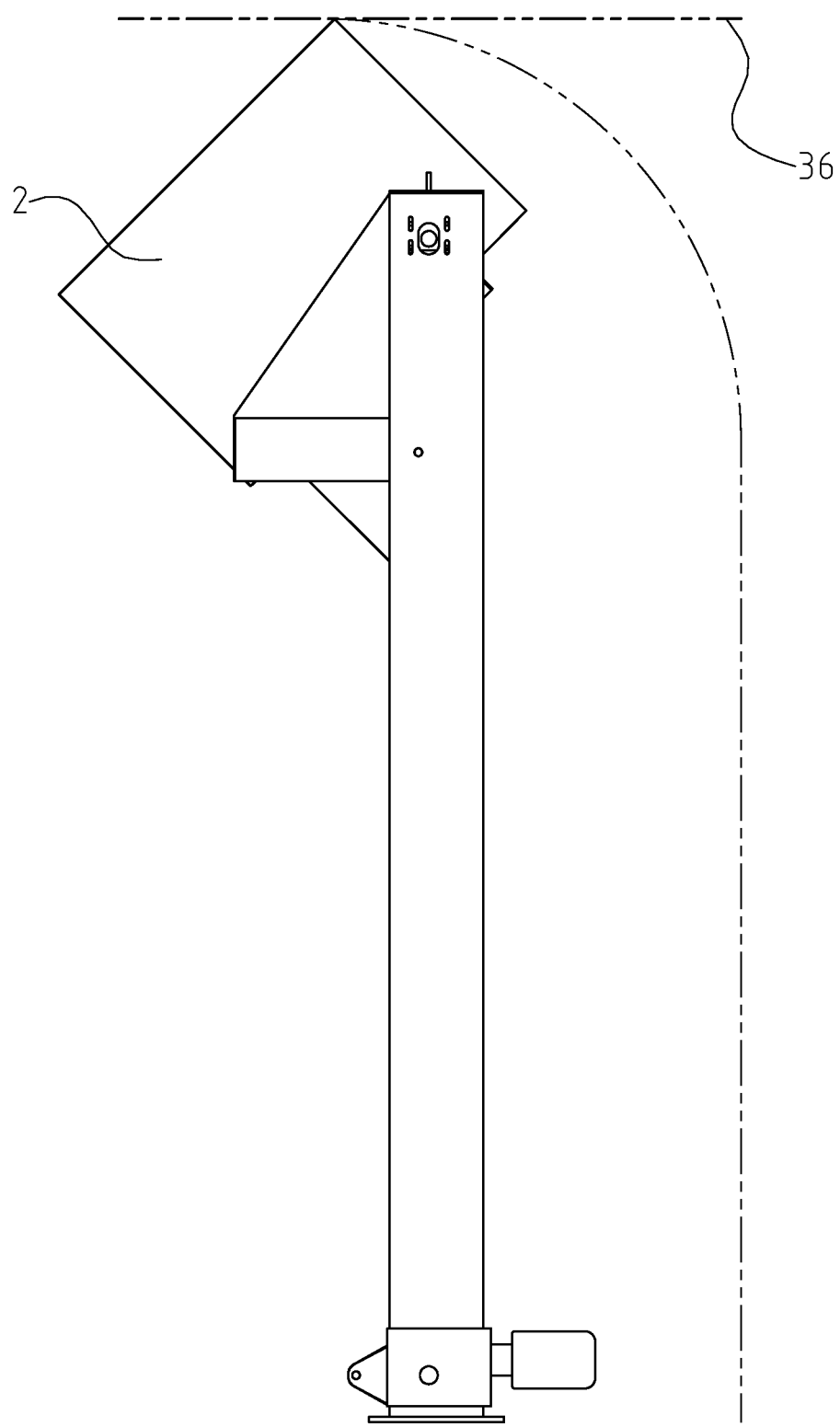
FIG. 14 is a side view depicting the uppermost path of the payload carrying element.

Shown in the illustrated embodiment of FIG. 13 and FIG. 14, an electric motor type prime mover 34 is paired with a gear type power converter 37 which is capable of producing reversable low speed, high torque power. The prime mover 34 and power converter 37 are attached to the frame 1 using a torque arm type mount 40, although many common mount types may be used. A drive shaft 41 is rotationally coupled to the output of the power converter 37. The drive shaft 41 may be supported by the frame 1 in various locations along the drive shaft 41, using any type of common shaft bearing 42 which allows the shaft to rotate freely of the frame, but constrains its position radially and axially. One or more driven rotational elements 38 are coupled to the drive shaft 41 so that they are rotationally coupled, and also fixed to the drive shaft 41 radially and axially. Various common methods of rotational coupling may be used, including a key and keyway, splines, clamping hub, etc. In the illustrated embodiment FIG. 13, the driven rotational elements 38 and drive shaft 41 are located at the lower end of the frame 1, below the furthest displacement of the lower pivot assembly 18. In the illustrated embodiment FIG. 13, one driven rotational element 38 is housed within each frame column 7. At the opposite end of each frame column 7, an idle rotational element 39 is located, and attached to the frame 1 so that it is held in place radially and axially, but may rotate freely. Both the driven rotational elements 38 and the idle rotational elements 39 may in some embodiments be fully or partially housed within the frame column cavity 9.

Shown in the illustrated embodiment of FIG. 13, each driven rotational element 38 engages a tension-only member 33 to transmit sufficient power to the tension only member 33. Various common types of tension-only members 33 used may include but not limited to chain, roller chain, cable, strap, rope and various belt types. Various common types of rotating elements 35 may also be used to both route and transmit power to and from the tension-only member 33, including but not limited to sprockets, sheaves, opposing drive rollers, textured shaft, shaft and winch drum depending on the type of tension-only member 33 used. From where it engages the driven rotational element 38, each tension-only member 33 is then routed up, over the idle rotational elements 39, and down to the where it is attached to the lower pivot assembly 18 of the drum. The opposite end of the tension-only member 33 is run up from where it engages the driven rotational element 38 and is attached to the opposite end of the lower pivot assembly 18, forming a continuous loop around the rotational elements 35. Each tension-only member 33 may be fully or partially housed within its respective frame column cavity 9. As illustrated in FIG. 12, In some embodiments, intermediate idle rotating elements 39 may be positioned along the path of the tension-only member 33.

Shown in the illustrated embodiment of FIG. 13, in order to clear all possible paths of the drum 2 without affecting the frame 1 height, the drive shaft 41 may be positioned to span between the frame columns 7 at any location along the path of the tension-only member 33, so long as the drive shaft 41 is below or to the side of the furthest displacement of the drum 2 path, so that the drive shaft 41 does not impede the motion of drum 2. It is noted that in other embodiments, a common drive shaft 41 may not be used to transmit power to all driven rotational elements 38 and could instead be replaced by the use of multiple prime movers 34, each mounted to a separate frame column 7 and driving the corresponding driven rotational element 38. In this configuration, without need for a drive shaft 41 spanning between frame columns 7, the driven rotating element 38 may be placed at any location along the path of the tension-only member 33 without impeding the drum 2 path.

Shown in the illustrated embodiment of FIG. 13, the tension-only member 33 forms a continuous loop around the rotational elements 35, with both ends of the tension-only member 33 being attached to opposite ends of the lower pivot assembly 18. In this configuration, the free length of the tension-only member 33 produced as the drum 2 is moved is continuously and automatically taken-up, allowing for sufficient tension to be maintained around the driven rotational element 38. While this configuration offers a simple method of taking-up the free length of the tension-only member 33, it is recognized that common alternative methods of take-up may be used without significantly altering the function of the drive system 5, such as a winch drum.

Shown in the illustrated embodiment of FIG. 12, in some embodiments, intermediate idle rotational elements 39 may be positioned along the intended path of the tension-only member 33. The intermediate idle rotating elements 39 may be used to guide or re-direct the tension-only member 33. Intermediate idle rotational elements will allow the drum 2 to be driven along a non-straight path of the guide system 3 in some cases.

Shown in the illustrated embodiment of FIG. 15 is an alternative drive system configuration that may be used to allow a prime mover 34 and rotational elements 35 to drive a plurality of tension-only members 33 that are coupled to opposing sides of the payload carrying element 2, in which all drive components may be positioned entirely below the uppermost path of the drum 36. In the illustrated embodiment, the driven rotational elements 38 located at one end of the frame columns 7 may be replaced by idle rotational elements 39, that re-direct each tension-only member 33 across the span of the frame assembly 7 below or to one side of the displacement of the drum 2 along any path to one or more driven rotational element(s) 38, around which each tension-only 33 member is wound. A prime mover 34 and possible power converter 37 of any type previously described may be used to drive the driven rotational element(s) 38.

When a component, part or layer is referred to as being "joined with," "on," "engaged with," "adhered to," "secured to," or "coupled to" another component, part or layer, it may be directly joined with, on, engaged with, adhered to, secured to, or coupled to the other component, part or layer, or any number of intervening components, parts or layers may be present. In contrast, when an element is referred to as being "directly joined with," "directly on," "directly engaged with," "directly adhered to," "directly secured to," or "directly coupled to" another element or layer, there may be no intervening elements or layers present. Other words used to describe the relationship between components, layers and parts should be interpreted in a like manner, such as "adjacent" versus "directly adjacent" and similar words. As used herein, the term "and/or" includes any and all combinations of one or more of the associated listed items.

The above description is that of current embodiments of the invention. Various alterations and changes can be made without departing from the broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular. Any reference to claim elements as "at least one of X, Y and Z" is meant to include any one of X, Y or Z individually, any combination of X, Y and Z, for example, X, Y, Z; X, Y; X, Z; Y, Z, and/or any other possible combination together or alone of those elements, noting that the same is open ended and can include other elements.

Reference throughout this specification to "a current embodiment" or "an embodiment" or "alternative embodiment" means that a particular feature, structure, or characteristic described in connection with the embodiment is included in at least one embodiment herein. Accordingly, the appearance of the phrases "in one embodiment" or "in an embodiment" or "in an alternative embodiment" in various places throughout this specification are not necessarily all referring to the same embodiment. Furthermore, the particular features, structures, or characteristics may be combined in any suitable manner in one or more embodiments.

We claim:

1. A bulk material processing system comprising:
a structural frame;
a guide system supported by the structural frame and defining a path for a plurality of guided elements, the path including a main branch and at least one secondary branch;
a payload carrying element operatively engaged with the guide system for selective movement along the path;
a drive system associated with the frame and the payload carrying element, the drive system configured to selectively move the payload carrying element along the path, the drive system including a prime mover, at least one rotational element and at least one tension-only member, the prime mover operatively engaged with the rotational member, the tension-only members coupled to opposite sides of the payload carrying element, the prime mover being disposed beneath the path;
a diverter member having a leading portion, a follower portion, and a horizontal pivot therebetween, the diverter member being rotatable about the pivot between a stowed position and a deployed position, wherein in the stowed position the leading portion does not intersect the main branch, and wherein in the deployed position the leading portion intersects the main branch and causes at least one of the plurality of guided elements to follow the at least one secondary branch and deflect the follower portion upwardly to rotate the diverter member into the stowed position, the diverter member having a center of mass that is laterally offset from the pivot such that the diverter member counter-rotates from the stowed position to the deployed position due to gravity.

2. The bulk material processing system of claim 1 wherein the prime mover is at least one of a motor and an engine.

3. The bulk material processing system of claim 1 wherein the drive system includes a gear reduction unit or gear multiplier unit disposed between the prime mover and at least one of the tension-only members.

4. The bulk material processing system of claim 1 wherein the rotational element is at least one of a sprocket, sheave, opposing drive rollers, textured shaft, shaft and winch drum.

5. The bulk material processing system of claim 1 wherein the at least one tension-only member is at least one of a chain, roller chain, cable, rope, strap or belt.

6. The bulk material processing system of claim 1 wherein the payload carrying element is configured to receive or couple to at least one of a material in a container, loose material and a container of material.

7. The bulk material processing system of claim 1 wherein the payload carrying element is separately manufactured and attached to the at least one tension-only member.

8. The bulk material processing system of claim 1 further comprising:
a first hard stop on a first side of the main branch for limiting rotation of the diverter member beyond the stowed position; and
a second hard stop on a second side of the main branch for limiting counter-rotation of the diverter member beyond the deployed position.

9. A bulk material processing system comprising:
a track system defining a path having a main branch and at least one secondary branch;
a payload carrying element movably engaged with the track system by a plurality of guided elements, the plurality of guided elements being movable along the path; and
a diverter system selectively operable to cause a moving guided elements to follow the main branch or the at least one secondary branch, the diverter system including a diverter having a leading portion, a follower portion, and a horizontal pivot therebetween, the diverter being associated with an intersection between the main branch and the at least one secondary branch, the diverter selectively pivotable about the horizontal pivot between a first state in which the guided element moving through the intersection will follow the main branch and a second state in which the guided element will follow the secondary branch, wherein in the first state the leading portion does not intersect the main branch, and wherein in the second state the leading portion intersects the main branch and causes the moving guided element to follow the secondary branch and deflect the follower portion upwardly to rotate the diverter into the first state, the diverter having a center of mass that is laterally offset from the horizontal pivot such that the diverter counter-rotates from the first state to the second state due to gravity.

10. The bulk material processing system of claim 9 wherein the plurality of guided elements include at least one of a bearing, a track roller, wheel and a low-friction sliding element.

11. The bulk material processing system of claim 9 wherein the track system includes one or more track assemblies.

12. The bulk material processing system of claim 11 wherein at least two guide elements of the plurality of guided elements couple the payload carrying element to a track assembly, the diverter system being configured to cause at least one of the at least two guide elements to follow the at least one secondary branch to selectively vary an orientation of the payload carrying element relative to the main branch.

13. The bulk material processing system of claim 12 wherein the diverter system is configured to selectively operate the at least one diverter to direct movement of the at least two guide elements to route the payload carrying element to one of a plurality of different locations along the track system.

14. The bulk material processing system of claim 9 wherein the track system includes a pair of spaced-apart track assemblies, the pair of track assemblies guiding the payload carrying element from opposite sides.

15. The bulk material processing system of claim 9 wherein at least one diverter system includes an actuator configured to move the diverter between the first state and the second state.

16. The bulk material processing system of claim 9 further comprising:
a first hard stop on a first side of the main branch for limiting rotation of the diverter beyond the first state; and
a second hard stop on a second side of the main branch for limiting counter-rotation of the diverter beyond the second state.

17. A bulk material processing system comprising:
a track system defining a path having a main branch and at least one secondary branch, the main branch and at least one second branch defining at least a first load position, a first dump position and a second dump position;
a payload carrying element movably engaged with the track system by a plurality of guided elements, the plurality of guided elements being movable along the path; and
a diverter system selectively operable to cause a moving guided elements to follow the main branch or the at least one secondary branch, the diverter system including a diverter having a leading portion, a follower portion, and a horizontal pivot therebetween, the diverter being associated with an intersection between the main branch and the at least one secondary branch, the diverter selectively pivotable about the horizontal pivot between a first state in which a guided element moving through the intersection will follow the main branch and a second state in which a guided element will follow the secondary branch, wherein in the first state the leading portion does not intersect the main branch, and wherein in the second state the leading portion intersects the main branch and causes the moving guided element to following the second branch and deflect the follower portion upwardly to rotate the diverter into the first state, the diverter having a center of mass that is laterally offset from the horizontal pivot such that the diverter member counter-rotates from the first state to the second state due to gravity.

18. The bulk material processing system of claim 17 further including a drive system associated with the payload carrying element, the drive system configured to selectively move the payload carrying element along the path.

19. The bulk material processing system of 18 wherein the drive system includes a prime mover and two or more tension-only members operatively engaged with the prime mover, the tension-only members coupled to opposite side of the payload carrying element.

20. The bulk material processing system of 19 wherein the diverter system includes at least one diverter actuator providing automated movement of the diverter between the first state and the second state.

21. The bulk material processing system of claim 17 further comprising:
a first hard stop on a first side of the main branch for limiting rotation of the diverter beyond the first state; and
a second hard stop on a second side of the main branch for limiting counter-rotation of the diverter beyond the second state.

* * * * *